US012413385B2

(12) United States Patent
Kratz et al.

(10) Patent No.: US 12,413,385 B2
(45) Date of Patent: **\*Sep. 9, 2025**

(54) METHODS FOR TIME SYNCHRONIZATION AND LOCALIZATION IN A MESH NETWORK

(71) Applicant: ZaiNar, Inc., Redwood City, CA (US)

(72) Inventors: Philip A. Kratz, Redwood City, CA (US); Mainak M. Chowdhury, Redwood City, CA (US); Jonathan Lu, Redwood City, CA (US); Siamak Yousefi, Redwood City, CA (US)

(73) Assignee: ZaiNar, Inc., Redwood City, CA (US)

( * ) Notice: Subject to any disclaimer, the term of this patent is extended or adjusted under 35 U.S.C. 154(b) by 95 days.

This patent is subject to a terminal disclaimer.

(21) Appl. No.: 18/134,520

(22) Filed: Apr. 13, 2023

(65) Prior Publication Data

US 2023/0254110 A1     Aug. 10, 2023

Related U.S. Application Data

(63) Continuation of application No. 17/338,543, filed on Jun. 3, 2021, now Pat. No. 11,658,798, which is a
(Continued)

(51) Int. Cl.
*H04L 7/08* (2006.01)
*G01S 5/02* (2010.01)
(Continued)

(52) U.S. Cl.
CPC ............ *H04L 7/08* (2013.01); *G01S 5/02216* (2020.05); *G01S 11/08* (2013.01); *H04L 7/0016* (2013.01); *H04L 7/041* (2013.01); *H04W 64/003* (2013.01)

(58) Field of Classification Search
CPC ........ G01S 5/0221; G01S 5/0215; G01S 5/14; G01S 5/021; G01S 5/06; G01S 5/0881;
(Continued)

(56) References Cited

U.S. PATENT DOCUMENTS

| | | | | |
|---|---|---|---|---|
| 5,220,332 A | * | 6/1993 | Beckner | G01S 11/02 |
| | | | | 342/127 |
| 9,983,292 B2 | * | 5/2018 | Hach | G01S 5/06 |

(Continued)

FOREIGN PATENT DOCUMENTS

| | | |
|---|---|---|
| JP | 2007524829 A | 8/2007 |
| JP | 2013217754 A | 10/2013 |
| JP | 2019128341 A | 8/2019 |

OTHER PUBLICATIONS

Office Action received in Japanese Patent Application No. 2023-563957 dated Apr. 24, 2024.

*Primary Examiner* — Cassi J Galt
(74) *Attorney, Agent, or Firm* — Run8 Patent Group, LLC; Peter Miller

(57) ABSTRACT

A method includes: scheduling transmission of a first synchronization signal by a first node; and scheduling transmission of a second synchronization signal by a second node. The method also includes, after transmission of the first synchronization signal: receiving, from the first node, a first phase reference associated with the first synchronization signal; and receiving, from the second node, a first phase-of-arrival of the first synchronization signal at the second node. The method additionally includes, after transmission of the second synchronization signal: receiving, from the second node, a second phase reference associated with the second synchronization signal; and receiving, from the first node, a second phase-of-arrival of the second synchronization signal at the first node. The method further includes calculating a propagation delay between the first node and
(Continued)

the second node based on the first phase reference, the second phase reference, the first phase-of-arrival, and the second phase-of-arrival.

18 Claims, 12 Drawing Sheets

Related U.S. Application Data continuation-in-part of application No. 17/135,566, filed on Dec. 28, 2020, now Pat. No. 11,271,709, and a continuation-in-part of application No. 17/080,729, filed on Oct. 26, 2020, now Pat. No. 11,686,805, and a continuation-in-part of application No. 17/025,635, filed on Sep. 18, 2020, now Pat. No. 11,271,713, and a continuation-in-part of application No. 16/846,030, filed on Apr. 10, 2020, now Pat. No. 11,722,979, said application No. 17/080,729 is a continuation of application No. 16/814,285, filed on Mar. 10, 2020, now Pat. No. 10,859,666, said application No. 17/135,566 is a continuation of application No. 16/588,722, filed on Sep. 30, 2019, now Pat. No. 10,911,211, said application No. 17/025,635 is a continuation of application No. 16/405,922, filed on May 7, 2019, now Pat. No. 10,833,840, said application No. 16/814,285 is a continuation of application No. 16/186,336, filed on Nov. 9, 2018, now Pat. No. 10,627,474.

(60) Provisional application No. 62/832,096, filed on Apr. 10, 2019, provisional application No. 62/738,889, filed on Sep. 28, 2018, provisional application No. 62/734,978, filed on Sep. 21, 2018, provisional application No. 62/690,476, filed on Jun. 27, 2018, provisional application No. 62/668,219, filed on May 7, 2018.

(51) Int. Cl.
*G01S 11/08* (2006.01)
*H04L 7/00* (2006.01)
*H04L 7/04* (2006.01)
*H04W 64/00* (2009.01)

(58) Field of Classification Search
CPC .... G01S 11/08; G01S 5/02216; H04W 84/18; H04W 64/003; H04L 7/08; H04L 7/0016; H04L 7/041
See application file for complete search history.

(56) References Cited

U.S. PATENT DOCUMENTS

| | | | |
|---|---|---|---|
| 10,692,318 B2* | 6/2020 | Leconte | B60R 25/245 |
| 10,833,840 B2* | 11/2020 | Kratz | H04W 56/0065 |
| 11,271,713 B2* | 3/2022 | Kratz | G01S 5/06 |
| 11,658,798 B1* | 5/2023 | Kratz | H04L 7/0016 |
| | | | 375/368 |
| 2021/0006389 A1 | 1/2021 | Kratz et al. | |

* cited by examiner

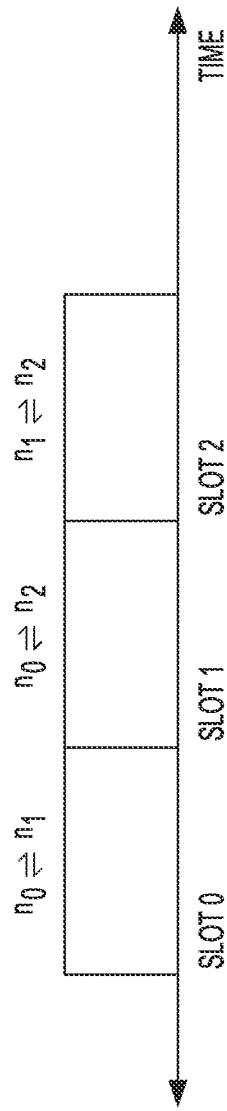
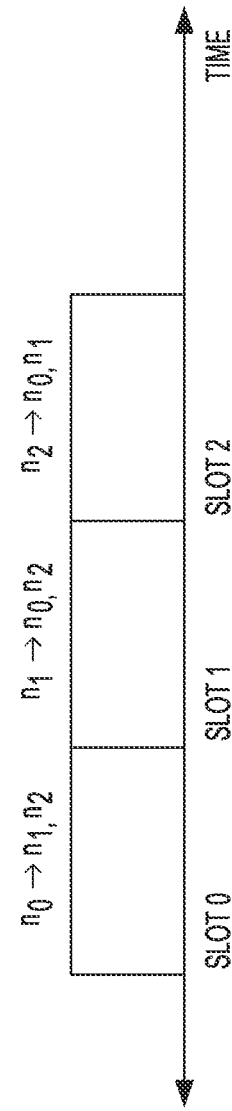
FIG. 4A
FIG. 4B

METHODS FOR TIME SYNCHRONIZATION AND LOCALIZATION IN A MESH NETWORK

CROSS-REFERENCE TO RELATED APPLICATIONS

This Application is a continuation of U.S. patent application Ser. No. 17/338,543, filed on 3 Jun. 2021, which is a continuation-in-part application of U.S. patent application Ser. No. 17/025,635, filed on 18 Sep. 2020, which is a continuation application of U.S. patent application Ser. No. 16/405,922, filed on 7 May 2019, which claims the benefit of U.S. Provisional Application No. 62/668,219, filed on 7 May 2018, and claims the benefit of U.S. Provisional Application No. 62/734,978, filed on 21 Sep. 2018, each of which is incorporated in its entirety by this reference.

U.S. patent application Ser. No. 17/338,543 is a continuation-in-part application of U.S. patent application Ser. No. 17/135,566, filed on 28 Dec. 2020, which is a continuation application of U.S. patent application Ser. No. 16/588,722, filed on 30 Sep. 2019, which claims the benefit of U.S. Provisional Application No. 62/738,889, filed on 28 Sep. 2018, each of which is incorporated in its entirety by this reference.

U.S. patent application Ser. No. 17/338,543 is a continuation-in-part application of U.S. patent application Ser. No. 17/080,729, filed on 26 Oct. 2020, which is a continuation application of U.S. patent application Ser. No. 16/814,285, filed on 10 Mar. 2020, which is a continuation application of U.S. patent application Ser. No. 16/186,336, filed on 9 Nov. 2018, which claims the benefit of U.S. Provisional Application No. 62/690,476, filed on 27 Jun. 2018, each of which is incorporated in its entirety by this reference.

U.S. patent application Ser. No. 17/338,543 is a continuation-in-part application of U.S. patent application Ser. No. 16/846,030, filed on 10 Apr. 2020, which claims the benefit of U.S. Provisional Application No. 62/832,096, filed on 10 Apr. 2019, both of which are incorporated in their entireties by this reference.

TECHNICAL FIELD

This invention relates generally to the field of networking and digital communication and more specifically to a new and useful method for time synchronization and localization in the field of networking and digital communication.

BRIEF DESCRIPTION OF THE FIGURES

FIGS. 4A and 4B are schematic representations of synchronization slot structures.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Methods for Characterizing Time Bias and/or Propagation Delay

Figure 1A:
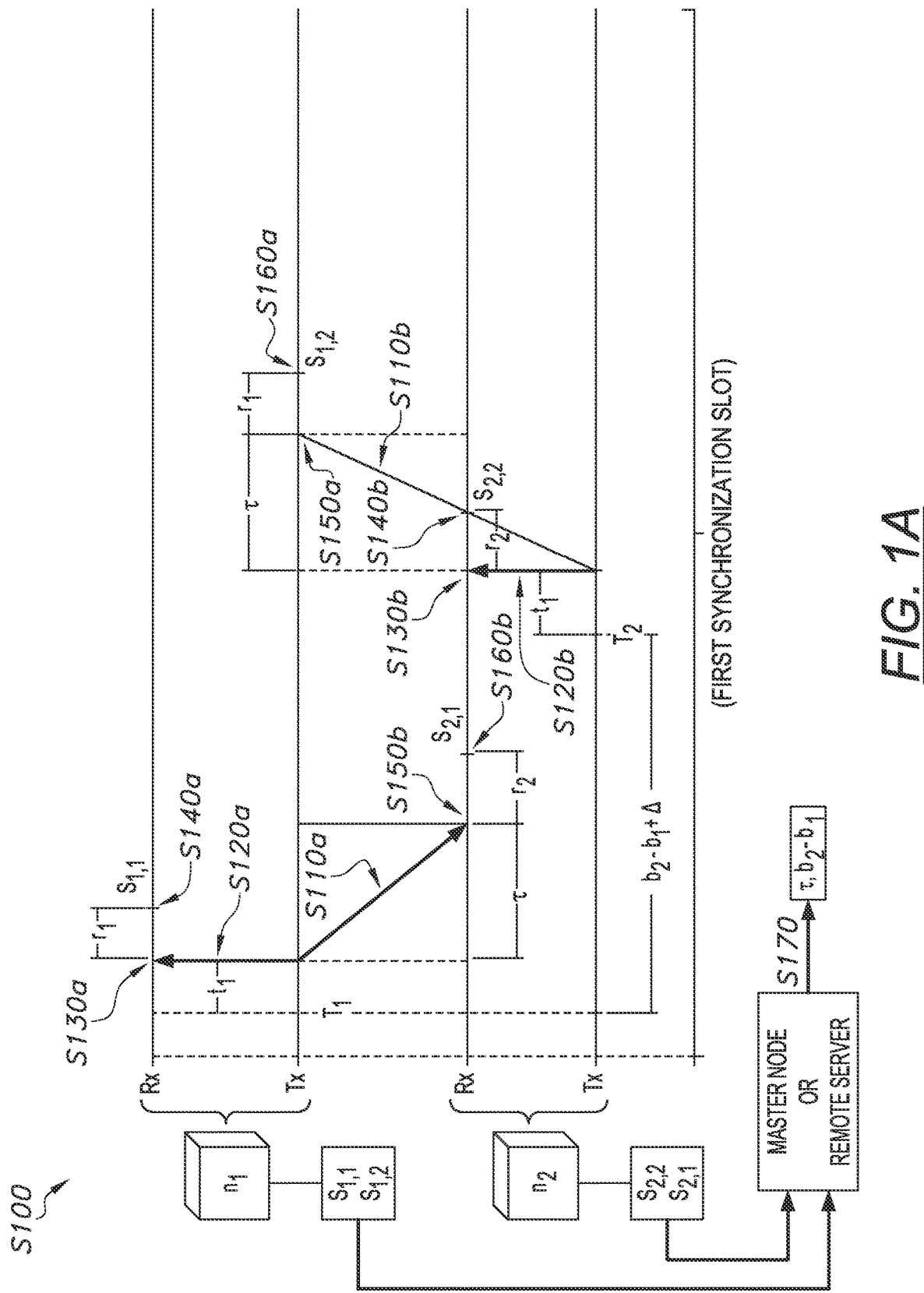
FIG. 1A is a flowchart representation of a method.

As shown in FIG. 1A, a method S100 for characterizing time bias and propagation delay between a pair of nodes includes, at a first node in the pair of nodes and during a first synchronization slot: transmitting a first synchronization signal at a first time according to a first clock of the first node in Block S110A; back-coupling the first synchronization signal to generate a first self-receive signal in Block S120A; receiving the first self-receive signal in Block S130A; calculating a time-of-arrival of the first self-receive signal according to the first clock in Block S140A; receiving a second synchronization signal from the second node in Block S150A; and calculating a time-of-arrival of the second synchronization signal according to the first clock in Block S160A. The method S100 also includes, at the second node and during the first synchronization slot: transmitting the second synchronization signal at a second time according to a second clock of the second node in Block S110B; back-coupling the second synchronization signal to generate a second self-receive signal in Block S120B; receiving the second self-receive signal in Block S130B; calculating a time-of-arrival of the second self-receive signal according to the second clock in Block S140B; receiving the first synchronization signal from the first node in Block S150B; and calculating a time-of-arrival of the first synchronization signal according to the second clock in Block S160B. The method S100 further includes calculating a time bias and a propagation delay between the pair of nodes based on: the time-of-arrival of the first self-receive signal; the time-of-arrival of the second synchronization signal; the time-of-arrival of the second self-receive signal; and the time-of-arrival of the first synchronization signal at the second node in Block Silo.

Figure 1B:
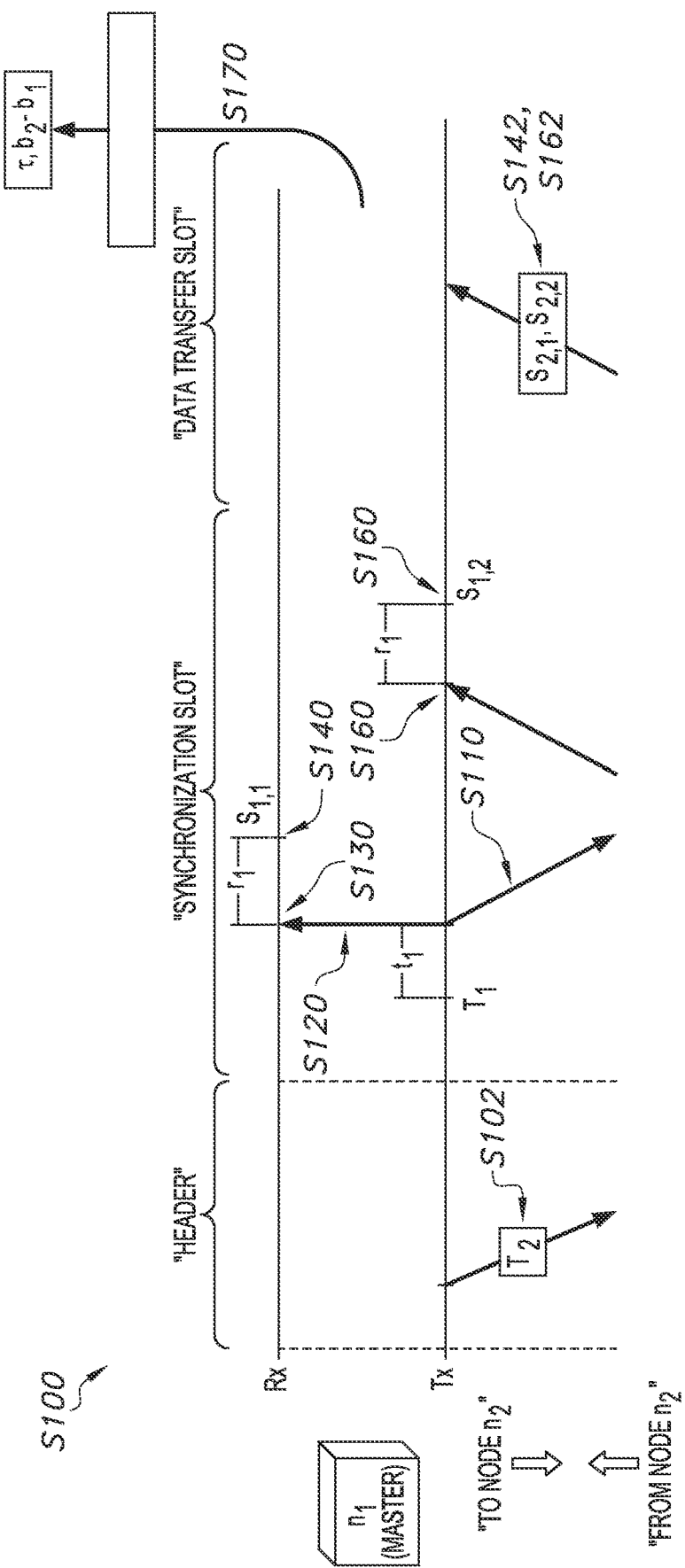
FIG. 1B is a flowchart representation of a first variation of the method.

As shown in FIG. 1B, a first variation of the method S100 includes: transmitting a coordination signal to a second node in the pair of nodes, the coordination signal indicating a second time to transmit a second synchronization signal in Block S102; transmitting a first synchronization signal at a first time according to a first clock of the first node in Block Silo; back-coupling the first synchronization signal to generate a first self-receive signal in Block S120; receiving the first self-receive signal in Block S130; calculating a time-of-arrival of the first self-receive signal according to the first clock in Block S140; receiving the second synchronization signal, the second synchronization signal transmitted by the second node at the second time according to a second clock of the second node in Block S150; calculating a time-of-arrival of the second synchronization signal according to the first clock in Block S160; receiving a time-of-arrival of a second self-receive signal from the second node, the second self-receive signal back-coupled by the second node upon transmission of the second synchronization signal, the time-of-arrival of the second self-receive signal calculated according to the second clock in Block S142; receiving a time-of-arrival of the first synchronization signal from the second node, the time-of-arrival of the first synchronization signal calculated by the second node according to the second clock in Block S162; and calculating a first time bias between the first clock and the second clock and a first propagation delay between the first node and the second node based on the time-of-arrival of the first self-receive signal, the time-of-arrival of the first synchronization signal, the time-of-arrival of the second self-receive signal, and the time-of-arrival of the second synchronization signal in Block S170.

Figure 1C:
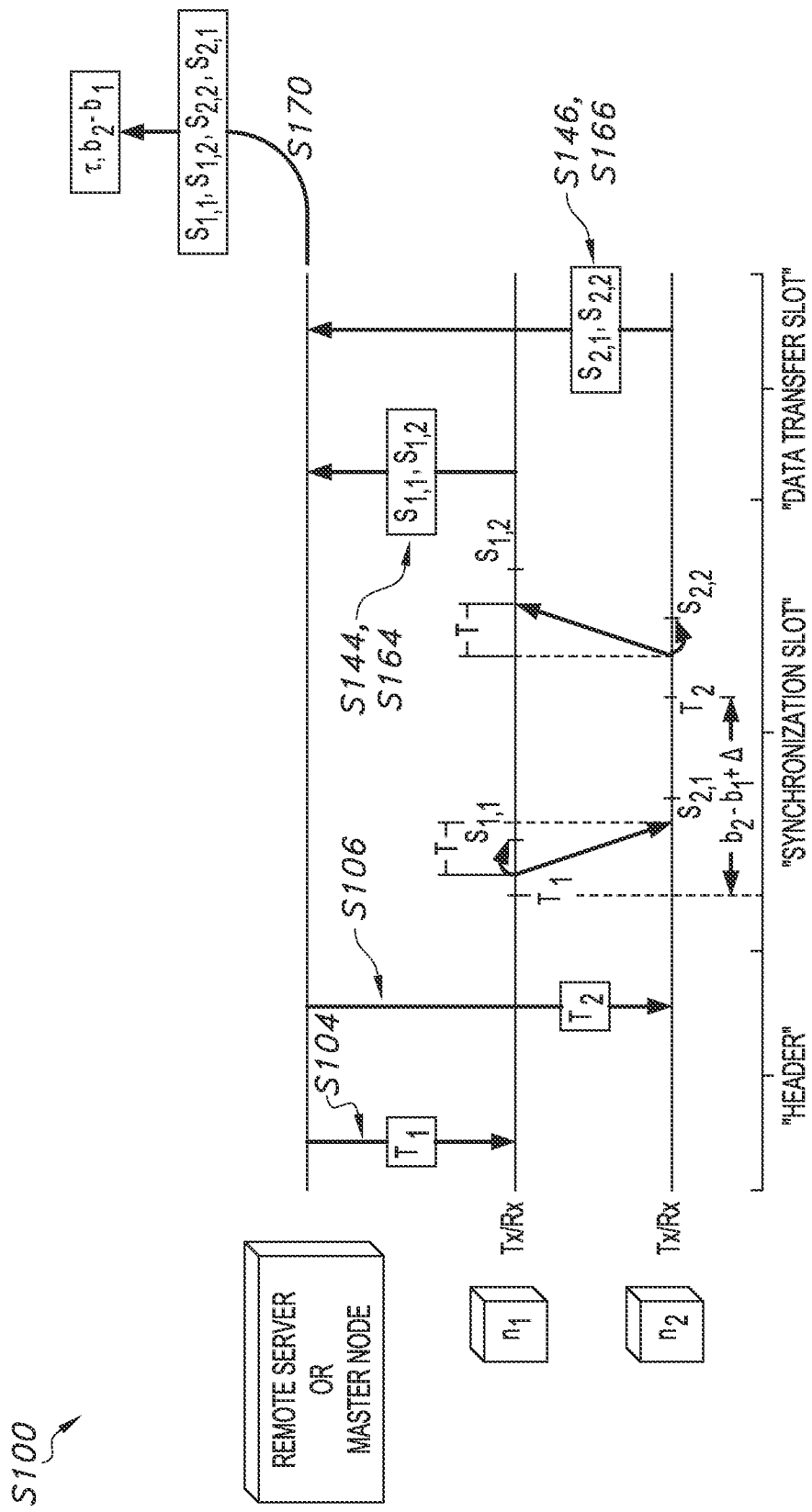
FIG. 1C is a flowchart representation of a second variation of the method.

As shown in FIG. 1C, a second variation of the method S100 includes scheduling transmission of a first synchronization signal at a first time by a first node in Block S104; and scheduling transmission of a second synchronization signal at a second time by a second node in Block S106. The second variation of the method S100 also includes, after transmission of the first synchronization signal by the first node at the first time according to a first clock of the first node: receiving, from the first node, a time-of-arrival of a first self-receive signal according to the first clock, wherein the first self-receive signal is a back-coupled version of the first synchronization signal in Block S144; and receiving, from the second node, a time-of-arrival of the first synchronization according to a second clock of the second node in Block S164. The second variation of the method S100 further includes, after transmission of the second synchronization signal by the second node at the second time according to the second clock: receiving, from the second node, a time-of-arrival of a second self-receive signal according to the second clock, wherein the second self-receive signal is a back-coupled version of the second synchronization signal in Block S146; and receiving, from the first node, a time-of-arrival of the second synchronization signal according to the first clock in Block S166. The second variation of the method S100 also includes calculating a first time bias between the first clock and the second clock and a first propagation delay between the first node and the second node based on the time-of-arrival of the first self-receive signal, the time-of-arrival of the first synchronization signal, the time-of-arrival of the second self-receive signal, and the time-of-arrival of the second synchronization signal in Block Silo.

A third variation of the method S100 includes: predicting a drift magnitude of the time bias between the first node and the second node between the first synchronization slot and the second synchronization slot based on a predictive drift model in Block S180; and setting a duration of the second synchronization slot equal to a sum of the maximum time bias uncertainty, the maximum accumulated drift magnitude over the duration of the first synchronization signal, the propagation delay, and a duration of the first synchronization signal in Block S190.

Figure 1D:
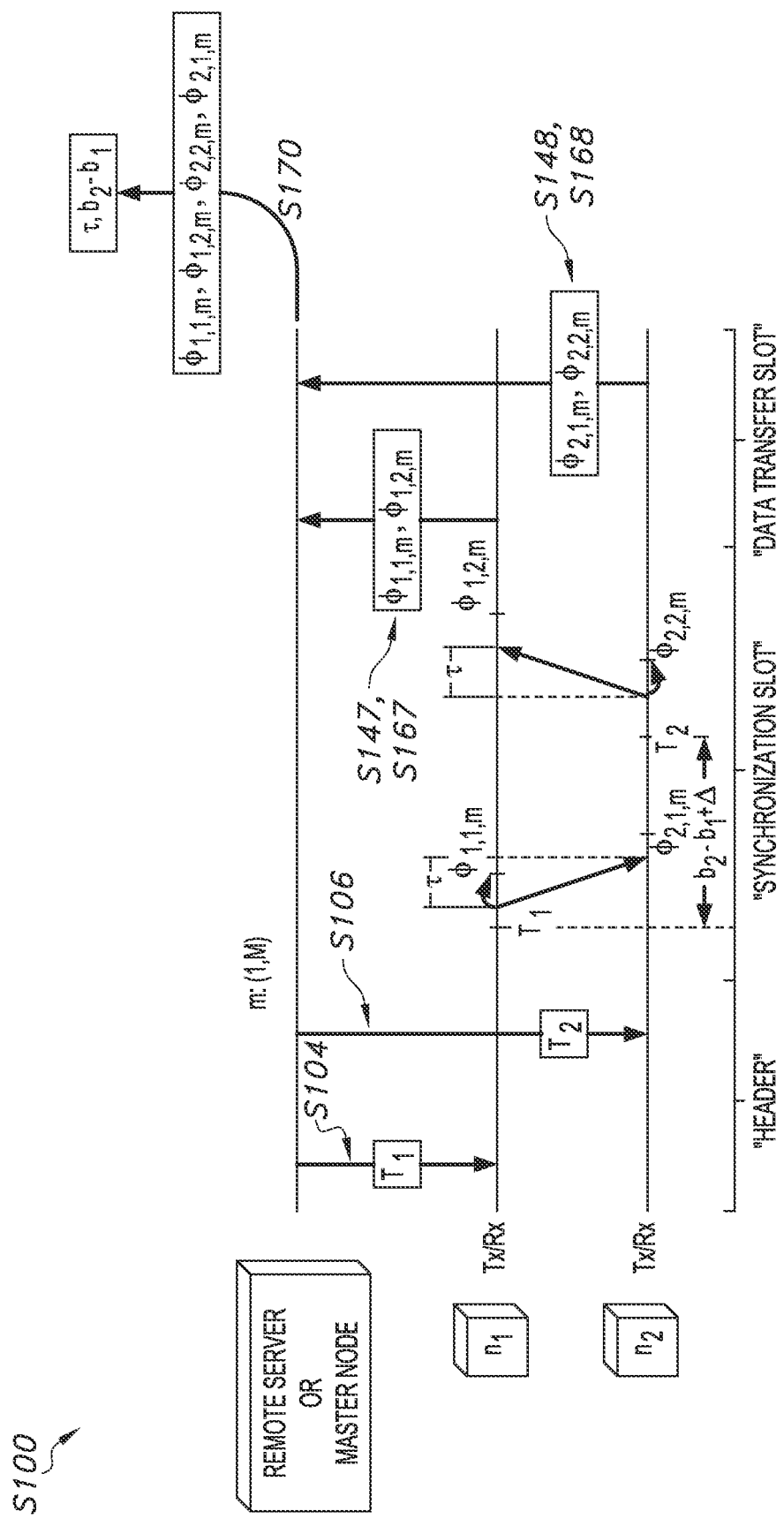
FIG. 1D is a flowchart representation of a third variation of the method.

As shown in FIG. 1D, a fourth variation of the method S100 includes: scheduling transmission of a first synchronization signal during a first synchronization slot by a first node, the first synchronization signal characterized by a first set of carrier frequencies in Block S104; and scheduling transmission of a second synchronization signal during a second synchronization slot by a second node, the second synchronization signal characterized by a second set of carrier frequencies in Block S106. This variation of the method S100 also includes, after transmission of the first synchronization signal by the first node during the first synchronization slot: receiving, from the first node, a phase reference for each carrier frequency in the first set of carrier frequencies in Block S147; and receiving, from the second node, a phase-of-arrival for each carrier frequency in the first set of carrier frequencies based on the first synchronization signal received at the second node in Block S167. This variation of the method S100 additionally includes, after transmission of the second synchronization signal by the second node at the second time: receiving, from the second node, a phase reference for each carrier frequency in the second set of carrier frequencies in Block S148; and receiving, from the first node, a phase-of-arrival for each carrier frequency in the second set of carrier frequencies in Block S168. This variation of the method S100 further includes calculating a propagation delay between the first node and the second node based on the phase reference for each carrier frequency in the first set of carrier frequencies, the phase-of-arrival for each carrier frequency in the first set of carrier frequencies, the phase reference for each carrier frequency in the second set of carrier frequencies; and the phase-of-arrival for each carrier frequency in the second set of carrier frequencies in Block S172.

1.1 Applications

Generally, the method S100 is executed by a pair of node devices (hereinafter "nodes") in a network and/or remote servers in order to synchronize to high precision—such as, for example, to within one nanosecond—the clocks of the pair of nodes. The method S100 can calculate the relative time bias between clocks to within, for example, one nanosecond or with sub-nanosecond precision without prior information regarding the signal propagation delay or physical distance between the two nodes (or even a requirement for the nodes to be stationary), without precise calibration of the hardware of either node, and with each node using standard electronic clock technology, such as a crystal oscillator clock. Additionally, the method S100 can utilize a frequency bandwidth of less than five megahertz (e.g., 500-100 kHz). The small bandwidth of the method S100 enables transmission on lower frequency bands with high propagation range and/or penetration. Examples of such bands include frequency bands for unlicensed use, cellular communications, and/or public safety uses (e.g., the 902-928 MHz ISM band, sub-GHz cellular bands, or 26.965-27.405 MHz Citizens Band Radio Service (CBRS)). Thus, the method S100 enables applications including, but not limited to, time-synchronized distributed antenna systems, which can further enable precise localization of RF emitting devices, remote sensing of public safety infrastructure, and improvements in time-based data transfer protocols.

More specifically, the method S100 for synchronizing time between two nodes can be categorized as a two-way ranging and synchronization protocol. However, the method S100 is distinguished from other two-way ranging protocols in that each node transmits independently of other nodes at an absolute time (according to the clock of each node), as opposed to transmitting in response to receiving signals from a leader node in the pair. Furthermore, each node is configured to execute a scheme to provide a local reference copy of the transmitted signal, within the transceiver hardware of the node, in order to provide a "time-of-departure" for each transmitted synchronization signal (via a back-coupling and/or reflection of a transmitted synchronization signal). The time-of-arrival of this reflected and/or back-coupled version of a transmitted synchronization signal (hereinafter a "self-receive signal") includes the transmit and receive chain delays that would be incurred by a signal transmitted by another node, thereby enabling direct comparison of the time-of-arrival of various signals without precise characterization of these delays and without assuming that response times of individual nodes are deterministic and symmetric.

Blocks of the method S100 can be executed by a system, which can include a pair of node devices (i.e. nodes) in a mesh network, a leader node and a follower node in a mesh network, and/or a remote server coordinating with a pair of nodes in a mesh network. Each node in the mesh network can include radio and baseband processing hardware, such as an antenna, transceiver hardware, an FPGA/DSP, a clock, and self-receive hardware (e.g. directional couplers, RF power splitters, combiners, circulators) further described below. However, the method S100 can also be performed between nodes in a wired network. The nodes in the mesh network are mutually connected to the internet or to a local area network such that the initial time bias between any pair of nodes in the mesh network is initially limited by the network time protocol (hereinafter "NTP"), or any other network time synchronization protocol. This time bias can range from tens of milliseconds to microseconds in many state-of-the-art networks.

Nodes in the mesh network communicate with each other on the frequency band or bands, which are shared and common between the nodes, using time division multiple access (hereinafter "TDMA") and/or code division multiple access (hereinafter "CDMA"), thereby minimizing frequency bandwidth usage. Thus, the nodes can execute Blocks of the method S100 during one or more synchronization slots within a TDMA frame structure. In one implementation, synchronization slot duration and frame length are dynamically adjustable. In particular, the method S100 can leverage smaller initial time biases between a pair of nodes to decrease synchronization slot duration and further reduce uncertainty in the time bias calculation. Furthermore, the frame structure can include data transfer frames enabling the nodes to communicate with each other or with a remote server via the internet protocol suite in order to execute Blocks of the method S100. For example, nodes can transfer a set of time-of-arrivals to a remote server for further processing according to the method S100.

Assuming an initial coarse clock synchronization between a pair of nodes (e.g. one to ten milliseconds), each of the pair of nodes transmits a synchronization signal to the other node at the beginning of the synchronization slot according to each node's clock. However, due to the relative time bias between each of the nodes, which may not be constant or generally known a priori, these synchronization signals are sent at times offset by the time bias between the two nodes. The synchronization signal is a frequency modulated, amplitude modulated, or phase modulated pseudorandom code or a combination of multiple codes (e.g., on multiple center carrier frequencies). Upon receiving the synchronization signal from the other node in the pair of nodes, each node calculates a time-of-arrival (hereinafter "TOA"), such as by using the magnitude, time offset, and carrier phase of the autocorrelation peaks associated with one or more codes.

Figure 3A:
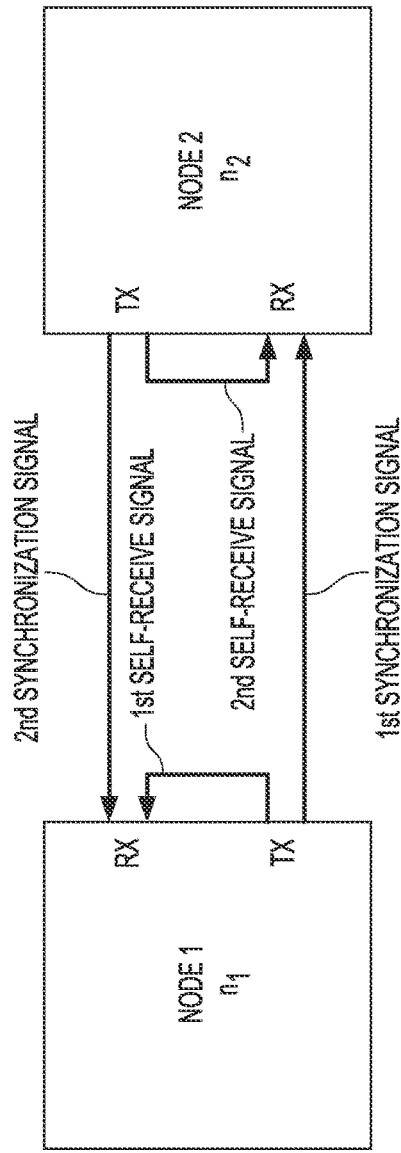
FIG. 3A is a schematic representation of a pair of nodes in the mesh network.

Upon transmitting the synchronization signal, each node leverages self-receive hardware (shown in FIG. 3C) that back-couples and/or internally reflects a portion of the synchronization signal, thereby generating a self-receive signal, as shown in FIG. 3A. The self-receive hardware reflects and/or back-couples an attenuated copy of the outgoing synchronization signal, which is then received by the same node that transmitted the synchronization signal. Each node then calculates a TOA for the self-receive signal after the self-receive signal has propagated through the same receive chain as an incoming synchronization signal received at the node's antenna. Thus, the TOA of the self-receive signal acts as a time-of-departure of the synchronization signal offset by the receiver delay time of the transmitting node. The method S100 includes generating the self-receive signal such that the TOA of an incoming synchronization signal from another node can be directly compared to a time of departure of an outgoing node without the need for precise measurement and/or calibration of the receiver delay.

Each node in the pair then receives the synchronization signal from the other node and calculates a TOA for the synchronization signal. Therefore, by the end of the synchronization slot, each node has recorded a TOA for a self-receive signal and for a synchronization signal of the other node. These TOAs are then transmitted to one of the nodes or to a remote server to solve a system of two equations for two unknowns: the relative time bias between the pair of nodes (including receiver delay) and the propagation delay between the pair of nodes. This system of equations is solvable based on the reciprocity theorem of electromagnetism. The relative time bias between clocks of the two nodes can then be calculated and tracked by a leader node or a remote server coordinating the mesh network. Alternatively, the relative time bias between nodes can then be reported to both nodes, and one node (i.e. a follower node) can then synchronize its clock to match the other (i.e. a leader node).

Although the first synchronization between the two node clocks according to the method S100 may be highly accurate, greater accuracy and reduced TDMA overhead is achieved through slot refinement, wherein the synchronization slot duration is reduced based on the smaller time bias between the two clocks. Therefore, in each successive synchronization slot for the pair of nodes, the synchronization slot duration is decreased, thereby reducing sources of error such as accumulated jitter and/or environmental frequency drift that may occur during the synchronization process. For example, a typical quartz crystal oscillator may be expected to have a frequency error of six ppm which corresponds to six nanoseconds of drift during a millisecond duration synchronization slot. If the synchronization slot duration is instead reduced to 100 microseconds, the expected drift is reduced to less than one nanosecond.

The system can also increase the duration of time within a frame for data transmission thereby improving data transfer rates for the nodes by executing synchronization slot refinement techniques. Additionally, with a shorter synchronization slot duration, the method S100 can be performed at a higher rate of repetition, thereby improving synchronization during changing environmental conditions.

After synchronization has occurred between a pair of nodes in the mesh network, the method S100 can be executed on a pairwise basis with other nodes in the mesh network in successive synchronization slots, thereby distributing common time across the entire mesh network.

In some implementations, the method S100 leverages repetitive synchronization between two nodes and pairwise synchronization between multiple nodes in the network, in combination with environmental data recorded from inertial measurement units (hereinafter "IMUs") or temperature sensors within each node, to create a predictive drift model for each node in the mesh network. The predictive drift model can characterize the time drift of a node as a function of measured environmental input data over time. The method S100 can also include triggering a synchronization slot in the next frame or altering the length of the synchronization slot based on the output of the predictive drift model. Alternatively, the method S100 can include adjusting a node's clock between synchronization slots.

Generally, the method S100 is described herein as including the detection of TOAs of synchronization signals and self-receive signals at nodes within a mesh network. However, the method S100 can also include detecting the phase-of-arrival (hereinafter "POA") of synchronization signals and self-receive signals in order to calculate the time bias and propagation delay between a pair of nodes in the mesh network. Furthermore, the method S100 can include transmission and reception of frequency-hopping spread spectrum signals as the synchronization signals, thereby enabling precise measurement of the relative time delay of the synchronization signal during transmission between the pair of nodes when compared to the self-receive signal.

1.2 Examples

The method S100 for synchronizing time between two node devices can be applied to a mesh network of nodes on a pairwise basis in order to improve the precision and flexibility of a localization protocol executed by the nodes. Additionally, the method S100 can increase the data transfer rate of a time-based multiple access protocol (e.g., by decreasing the buffer durations between slots of the protocol).

In one example application of the method S100, a mesh network of nodes can perform the method S100 on a pairwise basis to synchronize their clocks across the mesh network. Each of the nodes in the mesh network can then individually calculate a TOA of a signal from an RF emitting source not included in the mesh network. By comparing TOAs between the nodes in the mesh network and performing multilateration, the location of the RF emitting source can be calculated to a degree of precision limited by temporal synchronization between nodes. For example, with temporal synchronization within one nanosecond, the location of an RF emitting source can be calculated to within 30 centimeters relative to the nodes in the mesh network (assuming a wave speed corresponding to the speed of light in a vacuum, 299,792,458 meters per second). If one node in the mesh network acts as an anchor node and is calibrated with accurate global positional information, the absolute position of the RF emitting source can also be detected.

In one example application of mesh network-based localization, nodes are distributed throughout an area, within buildings, or even on cars driving on the streets of an urban area. The nodes execute Blocks of the method S100 to periodically synchronize their clocks and then collect TOA data for other RF emitting sources within the mesh area. The remote server coordinating with the nodes can subsequently transform these TOA data into three-dimensional geospatial locations of the RF emitting sources, thereby improving location services, asset tracking, and object detection. Thus, the remote server or leader node can: calculate a relative location of nodes in the network based on the propagation delay between the nodes; receive, from several nodes in the mesh network, a time-of-arrival of a signal from a transmitting device; and calculate, via multilateration, a relative location estimate for the transmitting device accounting for the relative time bias between each of the nodes in the mesh network.

In another example, TDMA based protocols may be limited to slot durations of a few tens of milliseconds. Therefore, Blocks of the method S100 can be executed to synchronize clocks of devices within a wired or wireless network in order to more accurately calculate the time bias, enabling a reduction in dead time and interference between slots while improving bit error rate (BER) and bandwidth utilization due to reduced inefficiencies in the multiple access protocol.

1.3 Telecommunication Deployment

Generally, the method S100 can be executed by a telecommunication network including cellular networks executing LTE, 4G, 5G, and 5G NR standards as maintained by the Third Generation Partnership Project (hereinafter "3GPP"). For example, the method S100 can be executed by nodes in a cellular network, such as by 5G Radio Nodes (hereinafter "gNB") and/or by Enhanced 4G eNodeBs (hereinafter "ng-eNB"), as a substitute for Partial Timing Support (hereinafter "APTS") or Full Timing Support (hereinafter "FTS") time distribution and/or synchronization methods. For example, nodes in a telecommunication network can execute the method S100 to enable Over-the-Air Synchronization (hereinafter "OAS") to reduce networking overhead and increase the precision of internode time synchronization.

1.4 Node Hardware

Figure 3B:
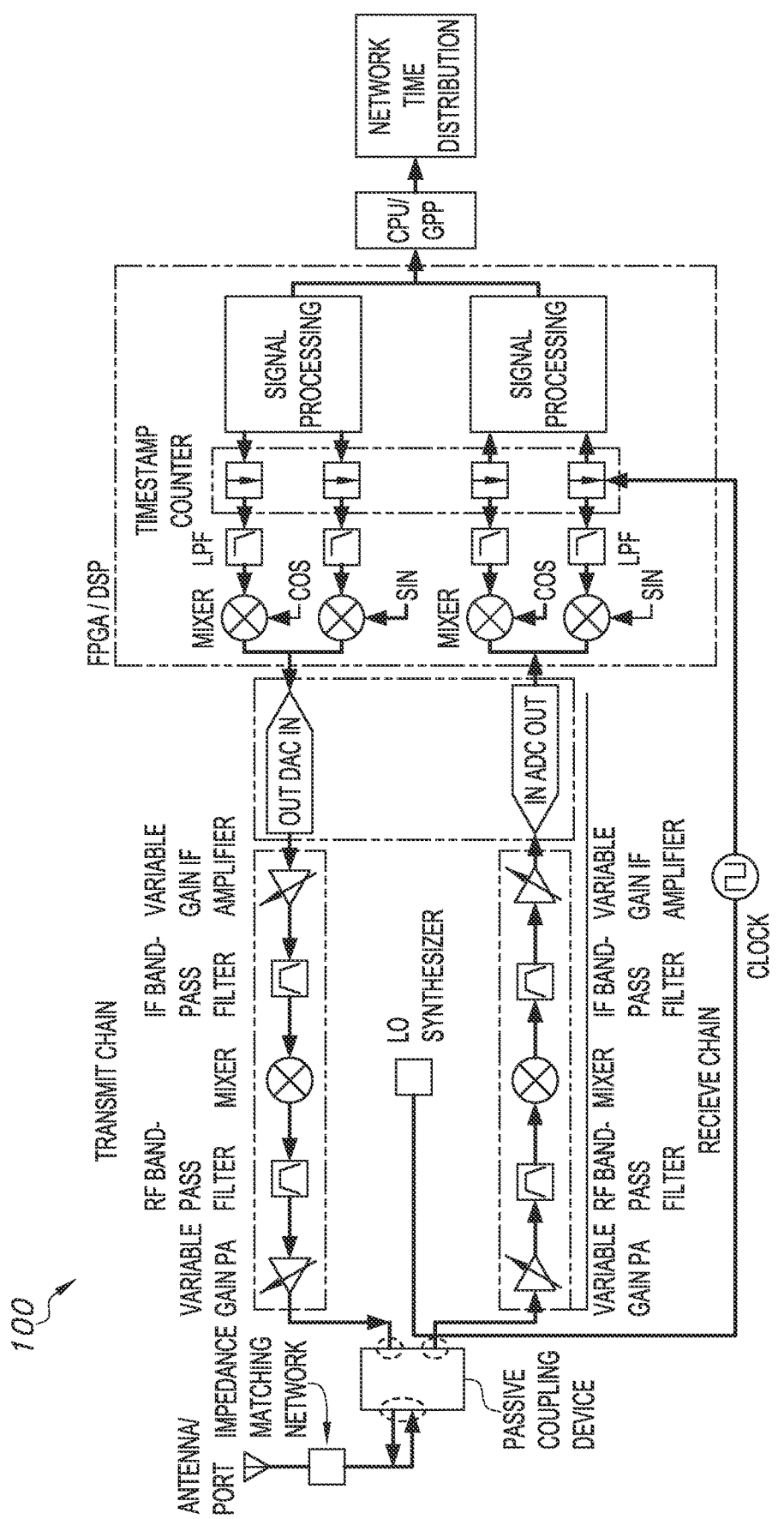
FIG. 3B is a schematic representation of a node in the mesh network.
Figure 3C:
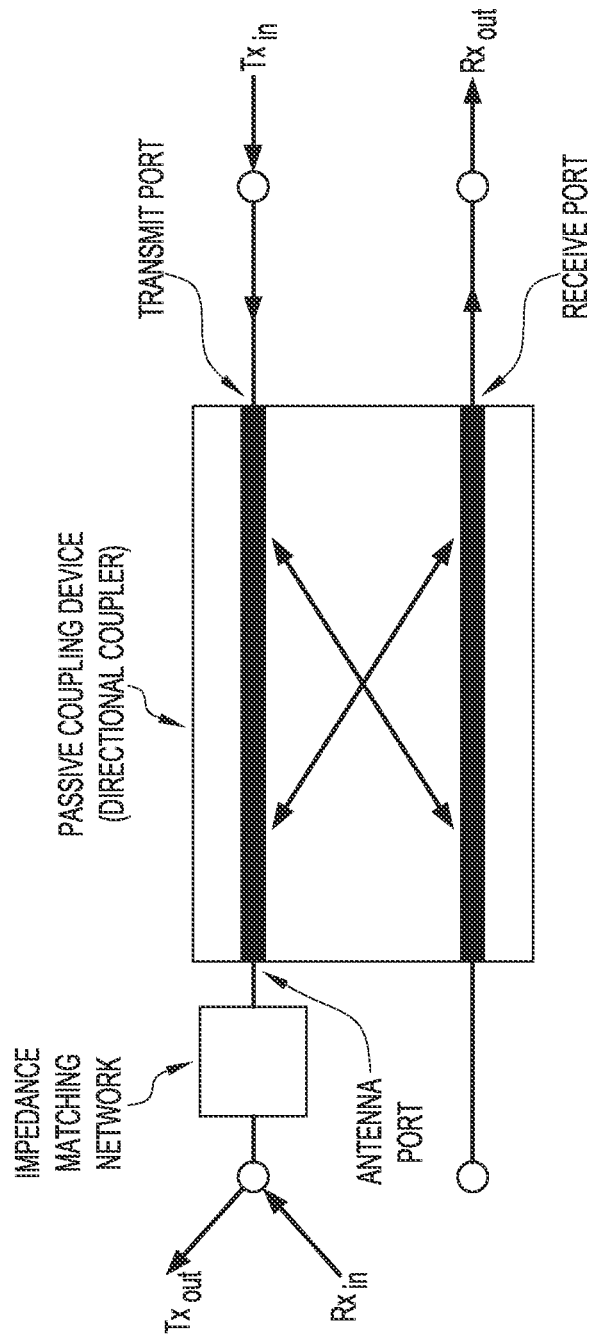
FIG. 3C is a schematic representation of self-receive hardware of a node.

As discussed above, the method S100 is executed by or via coordination with nodes in a network. Examples of hardware for wireless nodes are shown in FIGS. 3B and 3C. Generally, nodes include transmission components and receiver components, an FPGA and/or DSP configured to generate and process signals, a clock, and self-receive signal hardware.

In one implementation, the nodes transmit information wirelessly and, as such, include RF transceiver hardware such as a super heterodyne radio architecture and an Rx/Tx antenna shown in FIG. 3B. Alternatively, the nodes can include a zero-IF architecture (i.e., direct conversion-receiver). Each node includes a "receive chain" and a "transmit chain." The receive chain includes a pipeline of hardware components that process signals received from the Rx port. The transmit chain includes a pipeline of hardware components that process transmission signals generated by the FPGA or DSP and feed them into the Tx port. The receive chain and the transmit chain impart a "receive chain delay" and a "transmit chain delay" respectively. "Receive chain delay" and "transmit chain delay" describe the amount of time elapsed as a signal traverses either the receive chain or the transmit chain respectively.

In an alternate implementation, the nodes can communicate over a wired network. In this implementation, the nodes can include an I/O port and/or appropriate interface converters for communicating over any wired medium (e.g. ethernet/twisted-pair, coaxial, or fiber optic) instead of an antenna. These interface converters can also be used for providing the self-receive signal needed for measuring the propagation delay.

In one implementation, a node includes extant transceiver infrastructure such as cell tower, mobile phone, or any other RF transceiving device that has been adapted to execute the method S100. A cell tower or other extant transceiver can be adapted to execute the method S100 via software update alone. In alternate implementations, the nodes can include optimized hardware to improve the performance of the method S100, which can include impedance-matching networks at an antenna interface between a passive coupling device (e.g., coupling the transmit chain and the receive chain to the antenna).

In wireless node implementations, the FPGA or DSP of each node is configured to generate complex digital signals and output the generated signals to a DAC. The complex components of the digital signals represent the in-phase and quadrature portions (i.e. I/Q) of the analog signal to be generated by the DAC. Additionally, the FPGA or DSP of the node receives digital signals from the antenna of the node via an ADC and then timestamps received synchronization signals according to an instant value of its own clock and a TOA calculation process further described below.

Each node includes a clock, such as a crystal oscillator clock or an atomic clock, which executes time-keeping functions at the node and is also used for sampling, digital synthesis and processing. The method S100 can be executed to synchronize the clocks of multiple nodes within a network. In particular, the method S100 can effectively synchronize crystal oscillator clocks that satisfy basic frequency stability, phase noise, and frequency requirements for wireless and/or wired communications. In one example, the clock is a quartz crystal oscillator with an AT cut and a clock frequency of ten megahertz (MHz). However, a node can include a crystal oscillator of any frequency or cut assuming the aforementioned constraints are met.

Each node can include specific self-receive hardware, which back-couples and/or reflects a self-receive signal in Block S120. Generally, upon a node transmitting a synchronization signal, the self-receive hardware reflects and/or back-couples an attenuated repetition of the synchronization signal back to the receiving port of the transmitting node. By processing the transmitted synchronization signal via the receive chain and calculating a TOA for the self-receive signal, each node is able to timestamp transmitted signals delayed by the receive chain delay. When the node later receives a synchronization signal from another node, the TOA of the synchronization signal also incurs the same receive chain delay. Because the TOA of the self-receive signal and the TOA of the synchronization signal both include the receive chain delay, they can be directly compared without precise calibration of the receive chain hardware.

In one implementation, the self-receive hardware includes an impedance mismatched directional coupler shown in FIG. 3C. The self-receive hardware can also include a variable impedance circuit, controlled by the node, to adjust the gain of the reflected Tx signal into the Rx port in order to generate a self-receive signal. Depending on the specific hardware implementation of the node, similar impedance-matching can be applied to circulators, power splitters, or any other transmission line device, as further described below. In one implementation, a node can include standard antenna interface hardware with unintentionally mismatched antenna impedance (e.g., characterized by a voltage standing wave ratio greater than one), which can function as the self-receive hardware by reflecting synchronization signals at the antenna interface. Thus, each node need not include specialized self-receive hardware in order to execute the method S100.

The self-receive hardware defines a tuned reflection coefficient for signals incident to the interface between a passive coupling device and the antenna of the node, by including an impedance-matching network between the antenna and the passive coupling device. The impedance-matching network transforms the impedance of the antenna to an impedance that effects a precise reflection coefficient between the passive coupling device and the antenna. The reflection coefficient is selected such that the reflected power of the self-reflected signal is above the noise floor of the ADC and below the saturation voltage of the ADC.

In another implementation, the matching network can maintain the reflection coefficient for a wide range of signal frequencies. For example, the self-receive hardware can include a switchable wideband matching network to improve the consistency of the reflection coefficient across a wide range of transmit frequencies. In this example, the self-receive hardware can actively switch between multiple impedance-matching networks depending on the frequency of the signal being transmitted by the node.

In yet another implementation, the self-receive hardware can include a frequency multiplexer connected to multiple impedance-matching networks such that each distinct impedance-matching network encounters signals at a frequency that results in the precise reflection coefficient.

In an additional implementation, the system 100 can include an adaptive impedance-matching network that can adjust its impedance and therefore the reflection coefficient between the passive coupling device and the antenna. The node can then use the adaptive impedance-matching network to adjust the reflection coefficient, thus ensuring reception of the self-reflected signal despite changes in the noise levels at the ADC due to changing gains in RF transmit chain and/or receive chain amplifiers and/or interfering signals in the frequency band or bands of interest.

In one implementation, the self-receive hardware includes a directional coupler as the passive coupling device. The directional coupler includes four ports, two for each of the coupled transmission lines. In this implementation, the transmit port and the antenna port are located on the same transmission line in the directional coupler, while the receive port is located at the coupled port opposite the antenna, thereby receiving coupled power from the antenna and reflected power from the interface between the directional coupler and the antenna. Alternatively, the self-receive hardware can include a directional coupler wherein the receive port and the antenna port are located on the same transmission line. As a result, the receive port receives direct power from the antenna port and the reflected power from the antenna port. However, in this alternative implementation, the antenna port receives signals from the transmit port at a lower power due to coupling between the two transmission lines. Thus, a higher power at the transmit port results in the same power at the antenna port. However, in an implementation wherein the receive port and the antenna port are coupled to the same transmission line, the self-receive hardware can improve the sensitivity of the transceiver to signals received at the antenna.

In an alternative implementation, the self-receive hardware includes a power divider as the passive coupling device. The power divider divides power from an input port between two output ports. In this implementation, power input at the antenna port is split between the transmit port and the receive port, thus any power reflected at the interface between the antenna and the power divider is also divided between the transmit port and the receive port.

In yet another implementation, the self-receive hardware includes a circulator as the passive coupling device. The circulator can couple the transmit port directly to the antenna port while the antenna port is directly coupled to the receive port. Any reflections generated at the antenna port interface are then coupled back to the receive port.

In one implementation, each node can include a software-defined radio architecture performing the function of any of the hardware elements described above.

However, the self-receive hardware can include any software or hardware system for feeding a Tx signal into an Rx port of a node.

1.5 Gross Time Synchronization

Prior to execution of the method S100, the clocks of each node are coarsely synchronized using another time synchronization protocol. For example, the pair of nodes may be connected to the internet and in communication with one or more NTP servers. In one example, the pair of nodes can synchronize their clocks to between one and ten milliseconds according to NTP. Alternatively, in another example the pair of nodes can communicate with a global navigation satellite system (hereinafter "GNSS") time synchronization server and can synchronize to within one microsecond prior to execution of subsequent Blocks of the method S100.

Thus, the method S100 leverages existing time synchronization protocols, such that the nodes are able to communicate with the same synchronization slot in a TDMA described below.

Thus, a remote server can: coarsely synchronize a first node's clock and a second node's clock; schedule transmission of a first synchronization signal within a first synchronization slot of a first frame, the first synchronization slot characterized by a first synchronization slot duration; schedule transmission of a second synchronization signal within a second synchronization slot of the first frame, the second synchronization slot characterized by the first synchronization slot duration; configure the second node to receive the first synchronization signal during the first synchronization slot of the first frame; and configure the first node to receive the second synchronization signal during the second synchronization slot of the first frame.

1.6 Slot and Frame Definition

Generally, in the method S100, communication between a pair of nodes occurs according to a slot and frame TDMA structure, examples of which are shown in FIGS. 4A and 4B. The TDMA structure can include one or more slots for both time synchronization via the method S100 and data transfer. In one implementation, shown in FIG. 4A, each TDMA frame includes a synchronization slot to synchronize each unique pair of nodes in the mesh network. For example, a mesh network including three nodes, $n_1$, $n_2$, and $n_3$, would include a first synchronization slot for the synchronization of $n_1$ and $n_2$; a second synchronization slot for $n_1$ and $n_3$; and a third synchronization slot for $n_2$ and $n_3$. Alternatively, as shown in FIG. 4B, the TDMA frame can include a synchronization slot for each node in the mesh network to transmit a synchronization signal to all other nodes in the mesh network. For example, a mesh network including three nodes, $n_1$, $n_2$, and $n_3$, would include: a first synchronization slot for $n_1$ to transmit a synchronization signal to $n_2$ and $n_3$; a second synchronization slot for $n_2$ to transmit a synchronization signal to $n_1$ and $n_3$; and a third synchronization slot for $n_3$ to transmit a synchronization signal to $n_1$ and $n_2$.

In one implementation, (e.g., if the initial synchronization accuracy achieved with NTP is sufficiently low), each synchronization slot is further divided into two subsequent sub-slots to reduce synchronization overhead. For example, in a synchronization for $n_1$ and $n_2$, $n_1$ transmits during the first sub-slot and $n_2$ receives the transmission from $n_1$. Then, in a second sub-slot, $n_2$ transmits and $n_1$ receives.

Each TDMA frame can also include a header indicating the presence and order of synchronization slots and data transfer slots for each node in the mesh network. In one implementation, each TDMA frame includes a set of synchronization slots. Alternatively, each TDMA frame may or may not include a set of synchronization slots according to the header for the TDMA frame. In yet another implementation, a TDMA frame can include multiple sets of synchronization slots. In one implementation, the header can include a coordination signal transmitted by a remote server or leader node coordinating the TDMA protocol in order to communicate specific transmission times for synchronization signals to nodes in the mesh network.

The duration of synchronization slots and the buffer time between two synchronization slots corresponding to different pairs of nodes can vary depending on the implementation and factors such as the current known time bias between nodes and associated uncertainty. The method S100 can include adjusting synchronization slot duration based on the output of a predictive drift model, further described below. Furthermore, the synchronization slot duration can have a lower limit equal to a sum of the uncertainty in the time bias between the pair of nodes, the propagation time between the pair of nodes, the uncertainty of the propagation time between the pair of nodes, and the duration of the synchronization signal, of which the duration of the synchronization signal is typically the most significant factor. In one implementation, the slot and the buffer between synchronization slots are both set to one millisecond. Additionally or alternatively, the method S100 can include adjusting the synchronization slot duration as a function of the signal-to-noise ratio of previously received synchronization signals in order to provide additional measurement acquisition time to determine TOA of signals with lower signal-to-noise ratios.

Additionally, the duration of each TDMA frame is subject to a set of practical constraints. The TDMA frame duration can have an upper limit defined by the expected drift of the least stable node clock in the node pair compared to the desired accuracy of the clock synchronization process. For example, if one node clock is known to drift a typical maximum of one nanosecond per second due to accumulated jitter and frequency drift, and if the desired accuracy of the clock synchronization process is one nanosecond, the TDMA frame duration (or time between synchronization slots) is limited at one second such that the time bias between nodes is not likely to exceed one nanosecond.

Furthermore, the TDMA frame duration has a lower limit based on the sum of the expected initial clock offset between the nodes, the total duration of the synchronization slots, the total duration of any data transfer slots, and the total duration of any time buffers between slots. The frame duration must be sufficiently long for each node to receive the initial synchronization signal from each of the other nodes in the network while accounting for a large initial time bias. Thus, if the nodes are initially synchronized using NTP, the frame duration should be at least tens of milliseconds to account for time biases that are typical between NTP synchronized clocks.

In one implementation, during initial synchronization of a set of nodes in a mesh network, the set of nodes are configured (e.g., by the remote server) to broadcast a coordination signal at a predetermined time according to the clock of each node. Given initial coarse time synchronization between nodes, the system can designate a leader node as the first node to transmit a coordination signal to the other nodes. Each node in the mesh network can then confirm receipt of the leader node's confirmation signal, thereby designating it as the leader node. Thus, a first node in a pair of nodes can receive, from a second node in the pair of nodes, a confirmation of receipt of the coordination signal; and, in response to receiving confirmation of receipt of the coordination signal before the first node receives a second coordination signal from another node in the mesh network, can designate the first node as a leader node.

In an alternative implementation, the TOA of the coordination signal can be calculated at each node and sent to a remote server, which can then determine the leader node in the mesh network based on the measured propagation delays between nodes and corresponding distances, or a link quality metric such as the received signal strength indicator (RSSI). In yet another alternative implementation, the remote server designates the leader node or coordinates the TDMA slots and the method S100 for the set of nodes in the mesh network.

When communicating within a TDMA synchronization slot, each node in a pair of nodes executing the method S100 can transmit synchronization signals and receive both synchronization signals from other nodes and self-receive signals during the synchronization slot. Therefore, in one implementation, the nodes execute a time division duplex (hereinafter "TDD") or a half-duplex scheme to communicate within a synchronization slot. In this implementation, the synchronization signals transmitted by each node in a node pair are separated by a predetermined delay time (e.g., approximately half the synchronization slot duration) such that a first node in a pair of nodes can transmit a first synchronization signal and receive a self-receive signal corresponding to the first synchronization signal during a first division of the synchronization slot and subsequently receive a second synchronization signal (transmitted from a second node in the node pair) in a second division of the synchronization slot. In this implementation, nodes executing the method S100 can transmit a coordination signal including timing information such as slot division durations and timings to other nodes in the mesh network, thereby establishing a half-duplex communication link between the two nodes.

In one implementation, the system can implement a full-duplex (i.e. frequency division duplex, hereinafter "FDD") communication scheme whereby each node in a pair of nodes can transmit and receive synchronization signals simultaneously (e.g., wherein each synchronization signal is sent over multiple frequencies). Additionally, each node in a pair of nodes can be configured to simultaneously receive a self-receive signal back-coupled to the receiver of the node and a synchronization signal from a second node in the pair of nodes.

Therefore, in one implementation, a leader node in a pair of nodes can: transmit the coordination signal to the second node, wherein the coordination signal indicates a second time to transmit the second synchronization signal equal to a first time of transmission of the first synchronization signal; and establish a full-duplex communication link with the second node.

However, in applications wherein a larger bandwidth is available, the nodes can also communicate using frequency division multiple access or any other channel access method.

Furthermore, coordination signals and/or headers of synchronization signals can communicate via a frequency-hopping spread spectrum (hereinafter "FHSS") scheme for one or more subsequent synchronization signals, thereby specifying a set of carrier frequencies characterizing each synchronization signal and the timing (based on the coarse time synchronization between nodes) of each frequency hop in synchronization signals transmitted between nodes of the mesh network.

1.7 Time Bias and Propagation Delay Characterization

As shown in FIG. 1A, each node in a pair of nodes can execute Blocks S110, S120, S130, S140, S150, and S160 to: transmit synchronization signals to each other at a predetermined transmission time that is evaluated according to the clock of each node; back-couple the synchronization signal via the self-receive hardware of the node to form a self-receive signal; and record TOAs and/or POAs for the self-receive signal and the synchronization signal received from the opposite node in the pair of nodes. Thus, each node in a pair of nodes calculates two TOAs according to the node's clock or calculates a set of POAs corresponding to each carrier frequency of the synchronization signal. Each node can then send the TOA (or POAs) of the self-receive signal and the TOA (or POAs) of the synchronization signal (e.g., during a data transfer slot in the frame) either to one of the nodes in the pair of nodes or to a remote server in order to calculate the time bias between the pair of nodes and the propagation delay between the pair of nodes, in Block S110.

Variations of the method S100 shown in FIGS. 1B and 1C include additional Blocks for coordinating a pair of nodes executing the method S100. In the first variation shown in FIG. 1B, a leader node in the pair of nodes executes Blocks S102, S142, S162, and S170 in addition to the previously mentioned Blocks of the method S100 in order to: communicate a transmission time to the follower node; receive a TOA of the self-receive signal calculated by the follower node; receive a TOA of the synchronization signal calculated by the follower node; and calculate, at the leader node, a time bias and a propagation delay between the leader node and the follower node. Thus, the leader node can communicate a transmission time to the follower node such that the leader node can receive the synchronization signal transmitted by the follower node during a synchronization slot in the TDMA communication scheme.

In the second variation of the method S100 shown in FIG. 1C, a remote server or other computational device communicating with a pair of nodes executes Blocks S104, S106, S144, S146, S164, S166, and S170 of the method S100 to: schedule a transmission time for each of the pair of nodes; receive TOAs from each of the nodes for a synchronization signal received by each of the pair of nodes, and a self-receive signal received at each of the pair of nodes; and calculate a time bias and a propagation delay between the pair of nodes.

Therefore, in any of the abovementioned variations, various entities included within the system can cooperate to execute a time synchronization protocol between a pair of nodes in a mesh network in order to calculate a time bias and a propagation delay between the pair of nodes. In one implementation, the time biases are tracked by a remote server and accounted for when managing a TDMA communication protocol, when executing multilateration for transmitting RF devices, or when executing any other protocol utilizing a time synchronized mesh network. Alternatively, one of the nodes can function as a leader node and track time biases and propagation time between nodes in the mesh network.

In order to synchronize clocks of the pair of nodes relative to each other, each node in the node pair can concurrently or consecutively execute Blocks S110, S120, S130, S140, S150, and S160. For example, a first node in the pair of nodes can execute a first instance of these Blocks of the method S100 in S110A, S120A, S130A, S140A, S150A, and S160A, while a second node in the pair of nodes can execute a second instance of these Blocks in S110B, S120B, S130B, S140B, S150B, and S160B. For the purpose of clarity, description with reference to Blocks S110, S120, S130, S140, S150, or S160 can therefore apply to respective Blocks S110A, S120A, S130A, S140A, S150A, or S160A executed by the first node or respective Blocks S110B, S120B, S130B, S140B, S150B, or S160B executed by the second node.

Depending on the relative time bias between the two nodes, the first node can execute Blocks S110A, S120A, S130A, and S140A at any time relative to the second node executing Blocks S110B, S120B, S130B, and S140B (assuming both nodes are executing during the synchronization slot). However, the first node executes Blocks S150A and S160A to receive and calculate a TOA for a synchronization sent from the second node after the second node executes Blocks S110B, S120B, S130B, and S140B. Likewise, the second node executes Blocks S150B and S160B after the first node executes Blocks S110A, S120A, S130A, and S140A.

1.7.1 Transmission Times

In Blocks S110A and S110B each node in a pair of nodes transmits a synchronization signal at a predetermined or coordinated transmission time within a synchronization slot. In implementations wherein the nodes execute TDD, a first transmission time for Block S110A can be offset from a second transmission time for Block S110B by a transmission interval. Thus, each node in a pair of nodes transmits a synchronization signal at a predetermined transmission time according to each node's own clock. For example, if a first transmission time for a first node is set at 1:00:00, then the first node transmits the synchronization at 1:00:00 according to its own clock. Thus, from a third party perspective, each node transmits a synchronization signal offset by the time bias between the two nodes and offset by the transmission interval between the transmission times for each node.

Because each node measures its self-receive delay directly, instead of relying on deterministic delays that are consistent between different node hardware units, such as is in symmetrical double-sided two-way ranging protocols which use a poll-response scheme, the system executing the method S100 does not require precise calibration of receive chain delay, transmit chain delay, or intervening processing delay for each node in order to accurately calculate the time bias and propagation time between a pair of nodes. Furthermore, these delays need not be fixed, but can vary between measurements, wherein the system can use the measured self-receive delays to remove any systematic delay offsets due to variable receive chain delay, transmit chain delay, or intervening processing delay.

1.7.2 Synchronization Signal

Generally, the nodes in the mesh network can communicate (with each other or with a centralized server) in order to establish a synchronization signal corresponding to each synchronization slot of the synchronization protocol. More specifically, the synchronization signal for each synchronization slot is predetermined according to the synchronization protocol. Thus, each node can access and/or generate a template signal with which to cross-correlate (i.e., via a bit matched filter or I/Q matched filter) with the synchronization signal received from the opposite node.

In one implementation, the system generates a deterministic and unique synchronization signal for each synchronization slot according to a predetermined pattern. Additionally, the synchronization signal can include information specifying the pair of nodes exchanging the synchronization signal (for reception of both the self-receive signal and the synchronization signal transmitted between the pair of nodes). In another implementation, the synchronization signal is static across synchronization slots.

Generally, the synchronization signal can include a carrier signal modulated (e.g., via quadrature modulation) by a complex valued baseband signal (e.g., a phase shift keyed signal, a frequency-shift keyed signal) generated from a known code sequence to improve the signal-to-noise ratio of the signal as it is received by nodes in the mesh network. More specifically, the system includes a carrier signal characterized by a carrier frequency, $f_c$, modulated by a baseband signal that can include a code sequence at a transmitter chip period, $T'_c$. However, the system can generate synchronization signals characterized by any code sequence assuming the code sequence is known to both nodes in the pair of nodes executing the synchronization protocol.

Additionally, the system can receive and calculate the TOA and/or POA of synchronization transmitted over multiple simultaneous or successive carrier frequencies (e.g., multicarrier, or FHSS signals). More specifically, the nodes in the mesh network can receive an FHSS synchronization signal including multiple narrowband frequency components in order to extract a POA for each carrier frequency and therefore calculate an accurate time bias and propagation time between the pair of nodes.

1.7.2.1 Baseband Signal

Generally, the system generates a synchronization signal including a baseband signal that further includes a code sequence. More specifically, the system can receive signals including a pseudorandom binary code sequence, such as a Maximum Length code sequence (hereinafter "MLS"), a Gold code sequence, a Kasami code sequence, a Barker code sequence, or any other binary code sequence. In one implementation, the system can receive and timestamp signals including a code sequence that includes a constant amplitude, zero autocorrelation waveform in order to increase the sharpness of peaks generated in an amplitude response of the cross-correlation function. For example, the system can generate synchronization signals including a modulated MLS or an FSK modulated code sequence.

The system can calculate the TOA and POA of the signal within a shorter signal duration for signals with target auto-correlation properties (e.g., a high autocorrelation at zero delay and a low autocorrelation elsewhere). The system can receive signals with a baseband signal, s(t), of the form:

$$s(t) = \sum_{n=0}^{N-1} b_n g'(t - nT'_c),$$

where $T'_c$ is the transmitter chip period, $b_n$ (e.g., in $\{-1, 1\}$) is the known code sequence $\{b_n\}_{n=0}^{\infty}$, and $g'(t)$ is the chip waveform (a rectangular pulse or any other pulse shape). Thus, the time duration of the signal is $NT'_c$.

In one implementation, the system can generate synchronization signals including a fixed preamble (e.g., a bit sequence that does not change between synchronization signals), a variable syncword, and a data payload. In one example, the system can generate synchronization signals that include the code sequence, $b_n$, as a combination of the fixed preamble and the variable syncword. In another example, the system can generate synchronization signals that include the code sequence, $b_n$, only within the variable syncword. In yet another example, the system can generate synchronization signals that include the code sequence, $b_n$, within a predetermined section of the data payload.

In another implementation, the system can calculate (e.g., via brute force simulation) a code sequence (within the larger data carrying portions of the synchronization signal) that maximizes an autocorrelation peak ratio, which is defined as the ratio of the magnitude of the largest peak to the magnitude of the second largest peak in the autocorrelation function of the signal. More specifically, the system can generate a synchronization signal such that the autocorrelation of the synchronization signal is characterized by an autocorrelation peak ratio greater than a threshold autocorrelation peak ratio.

Alternatively, the system generates synchronization signals based on a continuous-valued and/or complex-valued baseband signal, as opposed to a binary code sequence. For example, the system can generate synchronization signals including a Zadoff-Chu sequence.

1.7.2.2 Carrier Signal

Generally, the system can generate a synchronization signal including a carrier signal modulated by the code sequence. More specifically, the system can receive a signal including a carrier signal characterized by a carrier frequency generated based on a local oscillator of the transmitting node. Thus, each node can transmit the synchronization signal to the opposite node in the pair of nodes over a given operating frequency.

In one implementation, the system can generate synchronization signals characterized by a set of carrier signals. In one example, the system can generate a synchronization signal defining a multicarrier signal, such as an OFDM signal, over multiple carrier frequencies. In an alternative example, the system can generate synchronization signals defining an FHSS signal that hops between multiple carrier frequencies. Thus, in this implementation, the system can identify a POA of the synchronization signal received from a receiving node in the pair of nodes, for each carrier frequency of the synchronization signal, relative to a phase reference calculated from the self-receive signal (e.g., POAs of the self-receive signal) received by the transmitting node.

Additionally or alternatively, the system can refine the calculation of the TOA of the signal based on phase values corresponding to cross-correlation peaks of a matched filter of the synchronization waveform with the measured signal. The system can therefore use synchronization signals characterized by any type of modulation, such as amplitude modulation, frequency modulation, or phase modulation.

In one implementation, in order for the nodes in the mesh network to receive the synchronization signal according to standard RF transceiver technology, the local node can generate a synchronization signal from the baseband signal described above by mixing the baseband signal (i.e., upconverting the baseband signal) with a local oscillator tone at the transmit carrier frequency. Upon receiving this upconverted signal, the remote node can filter and mix the received passband signal with a local oscillator tone at the receive carrier frequency (which may be different from the transmit carrier frequency, as is the case with frequency-division multiplexing), thereby down-converting the received passband to a received baseband signal.

1.7.3 TOA and POA Detection

Generally, the system (e.g., either a receiving node or server receiving samples of the synchronization signal or self-receive signal) can extract a TOA and/or a POA based on a receive synchronization signal or self-receive signal by executing a matched filter such as a bit-matched filter or an I/Q-matched filter based on a template of the synchronization signal. Thus, the system can calculate a cross-correlation between the template signal and the received baseband samples of the synchronization signal. The system can then identify peaks in the cross-correlation to obtain a TOA of the synchronization signal at the receiving node. The system can also extract the phase of the synchronization signal at the receiving node (or the phase of the self-receive signal at the receiving node) based on the phase response of the matched filter output.

1.7.4 Synchronization Protocol

Generally, each node: generates a synchronization signal (e.g., based on a known synchronization signal template for the synchronization slot); concurrently or consecutively transmits the synchronization signal to the other node in a pair of nodes; receives a self-receive signal based on the transmitted synchronization signal; and receives a synchronization signal from the other node in the node pair. For ease of description, the nodes in a node pair will be referred to as $n_1$ and $n_2$. However, $n_1$ and $n_2$ can refer to any two-node pair in a mesh network (e.g., $n_i$ and $n_j$). The method S100 includes calculating the relative time bias between $n_1$ and $n_2$ represented as $(b_1-b_2)$ and the propagation delay $\tau$. Based on the principle of reciprocity in electromagnetism, the propagation delay for a signal transmitted from $n_1$ to $n_2$ is equal to the propagation delay for a signal transmitted from $n_2$ to $n_1$ ($\tau_{1,2}=\tau_{2,1}\equiv\tau$).

In calculating TOA, such as in Blocks S140 and S160, the node can cross-correlate a received synchronization signal or self-receive signal with a template signal to determine a timestamp corresponding to the peak value of the autocorrelation function. In one implementation, each node performs digital autocorrelation between received signals and template signals. Alternatively, each node performs analog autocorrelation between an analog conversion of the digital synchronization signal and the template signal. The latter accounts for the value of the samples in addition to the time durations between samples. Furthermore, the node can refine the calculated TOA based on phase information extracted from the synchronization signal. In one implementation, the nodes can transmit each synchronization signal over multiple frequency bands to increase the number of carrier phase measurements obtained by the receiving node and therefore increase the accuracy of the TOA calculation, as is further described below.

In Block S110A, at local time $T_1$ (i.e. a first transmission time), $n_1$ generates a baseband synchronization signal at the FPGA or DSP. In one implementation, $n_1$ upconverts the baseband synchronization signal to a synchronization signal at the carrier frequency for transmission via the antenna and propagates the carrier synchronization signal along the transmit chain of $n_1$, thereby incurring a transmit chain delay, $t_1$. The analog carrier signal then interacts with the self-receive hardware, which reflects or otherwise back-couples the synchronization signal into the Rx port of $n_1$ as shown in Block S120A. The self-receive signal (i.e. the reflected or otherwise back-coupled) synchronization signal is a replica of the synchronization signal preserving the phase and group delay, though the power of the two signals may differ. In one implementation, the power of the self-receive signal is adjusted through the back-coupling mechanism and/or attenuators to ensure that the self-receive signal voltage level does not saturate the ADC of $n_1$.

In Block S130A, $n_1$ receives the self-receive signal as $n_1$ transmits the synchronization signal. While the self-receive signal propagates through the receive chain of $n_1$ the self-receive signal incurs receive chain delay, $r_1$. In Block S140A, $n_1$ calculates a local TOA of its self-receive signal, $S_{1,1}$, which is related to the unknown parameters of interest via the following equation:

$$S_{1,1} = T_1 + t_1 + r_1.$$

Thus, $S_{1,1}$ represents the TOA of the self-receive signal from $n_1$ according to the clock of $n_1$.

Figures 5A, 5B:
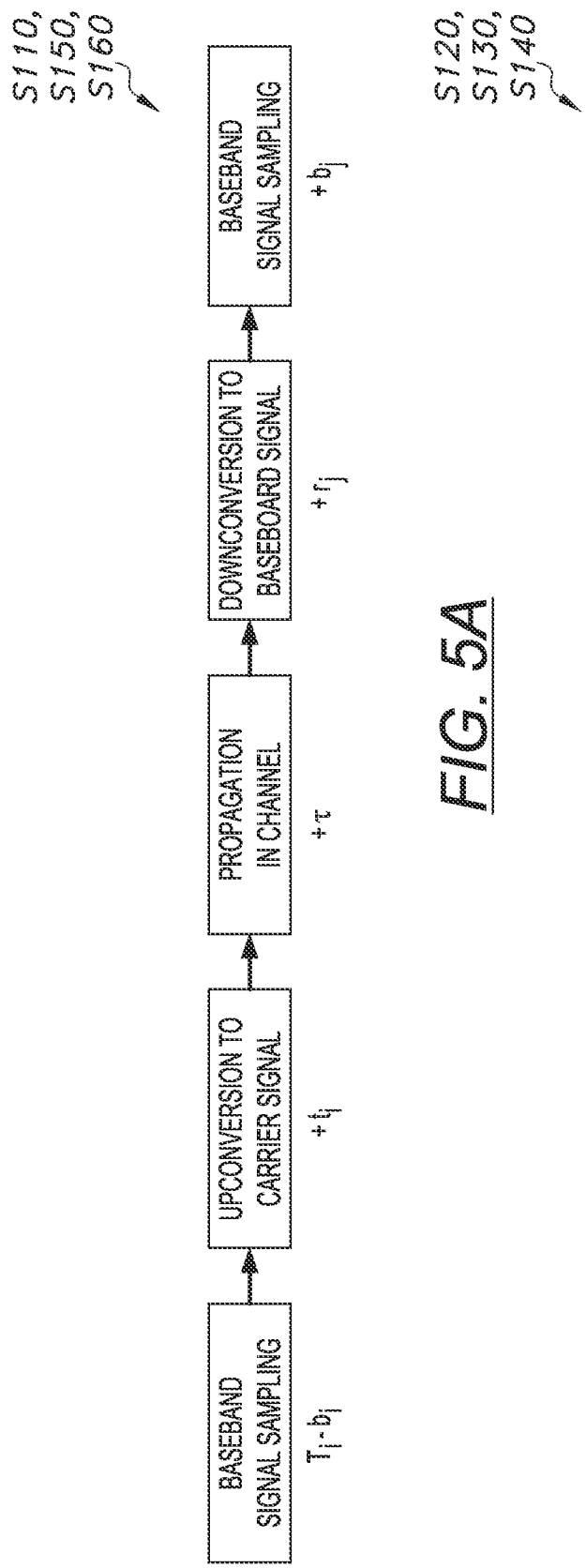
FIG. 5A is a flowchart representation of transmission and reception of a synchronization signal.
FIG. 5B is a flowchart representation of transmission and reception of a self-receive signal.

As shown in FIG. 5A, and in Blocks S110B, S120B, S130B, and S140B, $n_2$ executes the equivalent steps to those executed by $n_1$ in Blocks S110A, S120A, S130A, and S140A, thereby transmitting a second synchronization signal and calculating a TOA of the self-receive signal generated by $n_2$:

$$S_{2,2} = T_2 + t_2 + r_2,$$

where $T_2$ is a local time at $n_2$ (i.e. the second transmission time), $t_2$ is that transmit chain delay of $n_2$, and $r_2$ is the receive chain delay of $n_2$. In implementations wherein the transmission times for each of the nodes is offset by a transmission interval $\Delta$, $T_2 = T_1 + \Delta$. Thus, $S_{2,2}$ represents the measured TOA of the self-receive signal from $n_2$ according to the clock of $n_2$.

As shown in FIG. 5B, and in Block S150A, $n_1$ receives the synchronization signal from $n_2$, which propagates through the receive chain of $n_1$ incurring receive chain delay, $r_1$. In Block S160A, $n_1$ then calculates a local TOA for the synchronization signal received from $n_2$, $S_{1,2}$, which is expressed in the following equation:

$$S_{1,2} = T_2 - b_2 + t_2 + \tau + r_1 + b_1.$$

Thus, $S_{1,2}$ represents the measured TOA of the synchronization signal from $n_2$ according to the clock of $n_1$.

In Blocks S150B and S160B, $n_2$ executes the equivalent steps to those executed by $n_1$ in Blocks S150A and S160A, thereby receiving a synchronization signal from $n_1$ and calculating a local TOA (at $n_2$) for the synchronization signal, $S_{2,1}$, expressed as follows:

$$S_{2,1} = T_1 - b_1 + t_1 + \tau + r_2 + b_2.$$

Thus, $S_{2,1}$ represents the measured TOA of the synchronization signal from $n_1$ according to the clock of $n_2$.

In Block S170, one of the nodes (e.g., a leader node in the pair of nodes), either $n_1$ or $n_2$, or another computational device such as a remote server or a separate leader node, collects the above TOAs, $S_{1,1}$, $S_{1,2}$, $S_{2,2}$, and $S_{2,1}$, to calculate $\tau$ and $b_1 - b_2 + r_1 - r_2$, or the relative time bias plus the difference in receiver chain delay. By subtracting the TOA of the self-receive signal and the TOA of the corresponding synchronization signal received at opposite nodes the following is derived:

$$S_{1,2} - S_{2,2} = \tau + r_1 + b_1 - r_2 - b_2,$$

$$S_{2,1} - S_{1,1} = \tau + r_2 + b_2 - r_1 - b_1.$$

Thus, the system can calculate $\tau$ as:

$$\tau = \tfrac{1}{2}[(S_{1,2} - S_{2,2}) + (S_{2,1} - S_{1,1})]$$

and $b_1 - b_2 + r_1 - r_2$ is calculated as:

$$b_1 - b_2 + r_1 - r_2 = \tfrac{1}{2}[(S_{1,2} - S_{2,2}) - (S_{2,1} - S_{1,1})].$$

Although a value for the pure relative time bias, $b_1 - b_2$, cannot be calculated without the value of $r_1 - r_2$, adjusting the clock of one node in the pair of nodes by $b_1 - b_2 + r_1 - r_2$ ensures that any signal received by both nodes at the same time will receive the same timestamp at each node even if the instantaneous time at each clock differs by $r_1 - r_2$ because the difference in receive chain delay will compensate for the post inaccuracy in the time bias. Alternatively, if $r_1 - r_2 \cong 0$, then:

$$b_1 - b_2 \cong \tfrac{1}{2}[(S_{1,2} - S_{2,2}) - (S_{2,1} - S_{1,1})].$$

Once $\tau$ and $b_1 - b_2 + r_1 - r_2$ have been calculated, the method S100 can also include synchronizing the time between $n_1$ and $n_2$ by adding $b_1 - b_2 + r_1 - r_2$ to the clock of $n_1$ or $n_2$ to compensate for the initial time bias. In implementations with multiple nodes in the mesh network, one node is designated as a "leader node" while the other nodes are designated "follower nodes." Thus, in this implementation, the method S100 includes adjusting the clocks of the follower nodes to match the leader node. Alternatively, a leader node or remote server in the system can track the relative time bias of each node pair in a mesh network and compensate for the calculated time biases when executing processes that rely on precise time synchronization between nodes in the mesh network, such as time-based communication protocols or multilateration of other RF devices.

In one implementation, each node in the mesh network can subtract time bias measurements between different pair combinations of nodes to calculate a time bias and propagation delay when these variables are over-defined. For example, in a network including nodes $n_1$, $n_2$, and $n_3$, the time bias between $n_1$ and $n_2$ can also be calculated as follows:

$$b_1 - b_2 \cong \tfrac{1}{2}[(S_{1,3} - S_{3,3}) - (S_{3,1} - S_{1,1})] - \tfrac{1}{2}[(S_{2,3} - S_{3,3}) - (S_{3,2} - S_{2,2})].$$

Additionally, the method S100 can include indirectly calculating a time bias between nodes that do not have a direct communication line (e.g., due to an obstruction of communication between the two nodes). For example, in a network including nodes $n_1$, $n_2$, and $n_3$, the time bias between $n_1$ and $n_3$ can also be calculated as follows:

$$b_1 - b_3 \cong \tfrac{1}{2}[(S_{1,2} - S_{2,2}) - (S_{2,1} - S_{1,1})] - \tfrac{1}{2}[(S_{2,3} - S_{3,3}) - (S_{3,2} - S_{2,2})].$$

Thus, $n_2$ and $n_3$ can execute another iteration of the method S100 and the system can calculate a time bias between the first clock of $n_1$ and the third clock of $n_3$ based on a sum of the first time bias ($b_1 - b_2$) and the second time bias ($b_2 - b_3$).

Furthermore, the method S100 can include calculating an instantaneous uncertainty in the relative time bias between nodes, $\delta(b_1-b_2)$ and an instantaneous uncertainty in the propagation delay $\delta\tau$. Sources of uncertainty can include the propagated uncertainty based on the peak width of the autocorrelation function for each TOA calculation plus any expected phase noise that may occur at the clocks of each node between synchronization slots.

1.7.4.1 Phase-Based Synchronization Protocol

As shown in FIG. 1D, the system (via communication with the pair of nodes) can execute a phase-based variation of the synchronization protocol in which each node detects a POA (based on a template signal matching the synchronization signal) of the synchronization signal at $n_1$ and at $n_2$ and self-receive signal at $n_1$ and at $n_2$ in Blocks S167, S168, S147, and S148 respectively. Thus, the system can measure the relative phase delay between the POA of the synchronization signal received at an opposite node in the pair of nodes and the local phase reference provided by the POA of the self-receive signal and utilize this phase information to calculate the time bias and propagation delay between $n_1$ and $n_2$ in Block S172. Additionally, the system can execute the phase-based variation of the synchronization protocol for each carrier frequency of the synchronization signal, thereby detecting a set of POAs for each synchronization signal and self-receive signal including: the first self-receive signal received at $n_1$, the first synchronization signal received at $n_2$, the second self-receive signal received at $n_2$, and the second synchronization signal received at $n_1$. Upon receiving the first self-receive signal $n_1$ detects a carrier phase of the first self-receive signal, which is represented as follows:

$$\phi_{1,1,m} = (2\pi f_{c,m} T_1 + \phi'_{1,Tx,m} + \phi_{1,Rx,m}) \bmod 2\pi,$$

where $f_{c,m}$ represents the carrier frequency, $\phi'_{1,Tx,m}$ represents the frequency-dependent phase offset of the transmit chain of $n_1$, and $\phi_{1,Rx,m}$ represents the frequency-dependent phase offset induced by the receive chain of $n_1$. Thus, for a set of carrier frequencies $f_{c,1}$ through $f_{c,M}$, the system can generate a set of phase references, $(f_{c,1}, \phi_{1,1,1})$ through $(f_{c,M}, \phi_{1,1,M})$, for the self-receive signal received at $n_1$. Likewise, $n_2$ detects a carrier phase of the second self-receive signal, which is represented as follows:

$$\phi_{2,2,m} = (2\pi f_{c,m} T_2 + \phi'_{2,Tx,m} + \phi_{2,Rx,m}) \bmod 2\pi,$$

where $f_{c,m}$ represents the carrier frequency, $\phi_{2,Tx,m}$ represents the frequency-dependent phase offset induced by the transmit chain of $n_2$, and $\phi_{2,Rx,m}$ represents the frequency-dependent phase offset induced by the receive chain of $n_2$. Thus, for a set of carrier frequencies $f_{c,1}$ through $f_{c,M}$, the system can generate a set of phase references, $(f_{c,1}, \phi_{2,2,1})$ through $(f_{c,M}, \phi_{2,2,M})$, for the self-receive signal received at $n_2$.

The first set of phase-frequency points, $(f_{c,1}, \phi_{1,1,1})$ through $(f_{c,M}, \phi_{1,1,M})$, and the second set of phase-frequency points, $(f_{c,1}, \phi_{2,2,1})$ through $(f_{c,M}, \phi_{2,2,M})$, represent phase references for the frequency-dependent phase offset incurred by the synchronization signal as it interacts with the hardware of nodes $n_1$ and $n_2$.

Additionally, $n_1$ can detect the carrier phase of the synchronization signal received from $n_2$, which is represented as follows:

$$\phi_{1,2,m} = (2\pi f_{c,m}(T_2 - b_2 + b_1 + \tau) + \phi_{2,Tx,m} + \phi_{1,Rx,m}) \bmod 2\pi.$$

Thus, for the set of carrier frequencies $f_{c,1}$ through $f_{c,M}$, the system can generate a first set of POAs $(f_{c,1}, \phi_{1,2,1})$ through $f_{c,M}, \phi_{1,2,M})$ for the synchronization signal received at $n_1$.

Likewise, $n_2$ can detect the carrier phase of the synchronization signal received from $n_1$, which is represented as follows:

$$\phi_{2,1,m} = (2\pi f_{c,m}(T_1 - b_1 + b_2 + \tau) + \phi_{1,Tx,m} + \phi_{2,Rx,m}) \bmod 2\pi.$$

Thus, for the set of carrier frequencies $f_{c,1}$ through $f_{c,M}$, the system can generate a second set of POAs $(f_{c,1}, \phi_{2,1,1})$ through $f_{c,M}, \phi_{2,1,M})$ for the synchronization signal received at $n_2$.

In order to calculate $\tau$ for the pair of nodes $n_1$ and $n_2$, the system can calculate a first set of phase-frequency points $(f_{c,m}, \phi_{2,1,m} - \phi_{1,1,m})$ by calculating a phase difference between the phase reference of each carrier frequency of the first synchronization signal and the POA of each carrier frequency of the first synchronization signal. Likewise the system can calculate a second set of phase-frequency points $(f_{c,m}, \phi_{1,2,m} - \phi_{2,2,m})$ by calculating a phase difference between the phase reference of each carrier frequency of the second synchronization signal and the POA of each carrier frequency of the second synchronization signal. The relationship between phase and frequency for the first and second set of phase-frequency points can be represented as follows:

$$\phi_{2,1,m} - \phi_{1,1,m} = (2\pi f_{c,m}(T_1 - b_1 + b_2 + \tau) + \phi_{1,Tx,m} + \phi_{2,Rx,m} - 2\pi f_{c,m}T_1 - \phi_{1,Tx,m} - \phi_{1,Rx,m}) \bmod 2\pi = (\phi_{2,Rx,m}) + 2\pi f_{c,m}(\tau - b_1 + b_2) - \phi_{1,Rx,m}) \bmod 2\pi,$$

$$\phi_{1,2,m} - \phi_{2,2,m} = (2\pi f_{c,m}(T_2 - b_2 + b_1 + \tau) + \phi_{2,Tx,m} + \phi_{1,Rx,m} - 2\pi f_{c,m}T_2 - \phi_{2,Tx,m} - \phi_{2,Rx,m}) \bmod 2\pi = (\phi_{1,Rx,m} + 2\pi f_{c,m}(\tau - b_2 + b_1) - \phi_{2,Rx,m}) \bmod 2\pi.$$

Thus, the system can sum $(\phi_{2,1,m} - \phi_{1,1,m})$ and $(\phi_{1,2,m} - \phi_{2,2,m})$, for each carrier frequency, $f_{c,m}$, to generate a set of summed phase-frequency points $((\phi_{2,1,m} - \phi_{1,1,m}) + (\phi_{1,2,m} - \phi_{2,2,m}), f_{c,m})$. The system can then calculate the value of $\tau$ according to the following expression:

$$(\phi_{2,1,m} - \phi_{1,1,m}) + (\phi_{1,2,m} - \phi_{2,2,m}) = (4\pi f_{c,m}\tau) \bmod 2\pi,$$

$$\tau \in \left\{ \frac{(\phi_{2,1,m} - \phi_{1,1,m}) + (\phi_{1,2,m} - \phi_{2,2,m}) + n2\pi}{4\pi f_{c,m}} : n \in \mathbb{Z} \right\}.$$

Thus, by calculating a linear regression of the summed phase-frequency points (e.g., a periodic linear regression for each $2\pi$-wrap-around of the phase-frequency points), $((\phi_{2,1,1} - \phi_{1,1,1}) + (\phi_{1,2,1} - \phi_{2,2,1}), f_{c,1})$ through $((\phi_{2,1,M} - \phi_{1,1,M}) + (\phi_{1,2,M} - \phi_{2,2,M}), f_{c,M})$, the system can calculate the value of $\tau$ with subsample accuracy in accordance with the synchronization protocol described above. More specifically, the system can extract the slope of the periodic linear regression, which is approximately equal to $4\pi\tau$ in order to calculate $\tau$.

Thus, in one implementation, a remote server or leader node executing Blocks of the method S100 can, after transmission of the synchronization signal by $n_1$ at $T_1$ according to a clock of $n_1$: receive, from $n_1$, a phase of a first self-receive signal according to $n_1$; receive, from $n_2$, a phase of the synchronization signal from $n_1$ according to $n_2$; after transmission of the synchronization signal by $n_2$ at $T_2$ according to a clock of $n_2$, receive, from $n_2$, a phase of a second self-receive signal according to the clock of $n_2$; and receive, from $n_1$, a phase of the synchronization signal from $n_2$ according to the clock of $n_1$. The remote server or leader node can then refine the first propagation delay based on the phase of the first self-receive signal, the phase of the first synchronization signal, the phase of the second self-receive signal, and the phase of the second synchronization signal.

Alternatively, the system can also calculate a time bias between $n_1$ and $n_2$ by generating a set of subtracted phase-frequency points based on the first set of phase frequency points, $(f_{c,m}, \phi_{2,1,m} - \phi_{1,1,m})$, and the second set of phase-frequency points $(f_{c,m}, \phi_{1,2,m} - \phi_{2,2,m})$. More specifically, the system can calculate the time bias based on the following equation:

$$(\phi_{2,1,m} - \phi_{1,1,m}) - (\phi_{1,2,m} - \phi_{2,2,m}) = (\phi_{2,Rx,m} + 2\pi f_{c,m}(\tau - b_1 + b_2) - \phi_{1,Rx,m}) -$$
$$(\phi_{1,Rx,m} + 2\pi f_{c,m}(\tau - b_2 + b_1) - \phi_{2,Rx,m}) \mod 2\pi (\phi_{2,1,m} - \phi_{1,1,m}) -$$
$$(\phi_{1,2,m} - \phi_{2,2,m}) = 2\phi_{2,Rx,m} - 2\phi_{1,Rx,m} + 4\pi f_{c,m}(b_2 - b_1) \mod 2\pi.$$

Thus, by calculating a linear regression of the subtracted phase-frequency points $(f_{c,m}, (\phi_{2,1,m} - \phi_{1,1,m}) - (\phi_{1,2,m} - \phi_{2,2,m}))$ and extracting a slope of the linear regression, the system can calculate $b_2 - b_1$ with subsample accuracy.

1.8 Clock Adjustment

Figure 2:
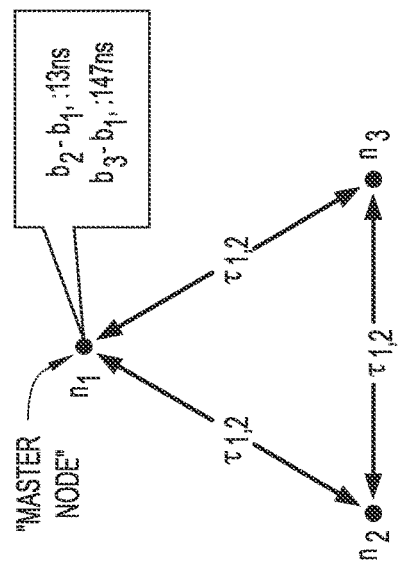
FIG. 2 is a schematic representation of a mesh network.

Once the system has executed the synchronization protocol and/or phase refinement for a pair of nodes, the system can shift the clock of one node in each pair of nodes by the calculated time bias in order to synchronize the clocks of the pair of nodes. Alternatively, as shown in FIG. 2 the system can maintain the time bias of each node relative to a leader node or other time standard (e.g., the clock of a remote server) and correct scheduling times sent to each node and/or timestamps received from each node based on the latest calculated time bias of the node relative to the leader node or time standard—such as by subtracting the time bias of the node from any timestamps calculated by the node. Furthermore, the system can predict a current time bias for each node based on the most recently calculated time bias and the predictive drift model for the node (further described below).

1.9 Synchronization Slot Refinement

In Block S180, the method S100 includes calculating a duration of a subsequent synchronization slot between previously synchronized nodes. Once a pair of nodes have executed the method S100, their clocks may be aligned to within one to ten nanoseconds. Thus, the synchronization slot can be made successively smaller as the synchronization between the two nodes improves.

The method S100 can also include calculating durations of subsequent synchronization slots based on a combination (e.g., an uncertainty propagated sum) of: the time bias uncertainty; the expected drift in the relative time bias between synchronization slots (calculated via the predictive drift model further described below); the propagation delay; the propagation delay uncertainty; the greater of the transmit chain delay of the first node or the transmit chain delay of the second node; the greater of the receive chain delay of the first node or the receive chain delay of the second node; the duration of the synchronization signal; and/or the expected change in the propagation delay due to relative movement between the pair of nodes.

In one implementation, the synchronization slot is additionally lengthened by a time buffer to ensure that each node receives a complete synchronization signal within the synchronization slot. When the synchronization slot duration is set equal to the above sum, the synchronization slot duration is long enough to allow a synchronization signal generated at one node to be fully received at the second node in application for which greater than expected drift or error occurs in any of the aforementioned quantities.

In one example, receive chain delay and transmit chain delay may be negligible when compared to the synchronization signal duration. Therefore, the method S100 can include adding a time buffer of a duration approximating a maximum sum of a typical receive chain delay and a typical transmit chain delay to calculate a synchronization slot duration.

In one implementation, following a failure to synchronize caused by, for example, a greater than expected drift in the time bias between nodes or large increase in propagation delay, the method S100 can include inserting a synchronization slot in a subsequent TDMA frame and increasing the synchronization slot duration to provide additional time to send and receive synchronization signals. The method S100 can increase the synchronization slot duration incrementally (e.g. in increments of ten microseconds) until the synchronization process is received or the method S100 can include extending the synchronization slot duration to a significantly longer duration to increase the likelihood of receiving a signal.

Thus, a remote server or leader node executing Blocks of the method S100 can decrease the synchronization slot duration for a subsequent synchronization slot corresponding to a pair of nodes such that the updated synchronization slot duration is less than the initial synchronization slot duration but greater than a sum of a first uncertainty in the first time bias between the clocks of the pair of nodes and a synchronization signal duration. The remote server or leader node can then schedule transmission times for each node in the pair of nodes within the updated synchronization slot duration.

Furthermore, the system can schedule the transmission times for synchronization signals in a pair of nodes based on a recently calculated time bias between the pair of nodes. Thus, the system can account for the relative time bias between nodes in order to ensure that both nodes are transmitting during the next synchronization slot despite the reduced duration of the synchronization slot.

1.10 Predictive Drift Model

In one variation of the method S100, the leader node or remote server executing Block Silo, can also execute a predictive drift model based on successive time bias and propagation delay characterization between nodes in the mesh network. Generally, the predictive drift model characterizes the drift of a node's clock (e.g. a crystal oscillator clock) relative to the clocks of other nodes in the network or relative to a time standard (e.g., UTC), as a function of environmental factors such as temperature, humidity, movement, and vibration. More specifically, the method S100 can include recording environmental data at each node and observing relative drift calculated over multiple prior synchronization slots to train a predictive drift model of the drift of particular nodes in the mesh network. The predictive drift model outputs the expected drift of one node in the mesh network relative to a leader node or a time at a remote server based on the time elapsed since the most recent synchronization slot for the node and recent environmental data collected at the node.

The system can maintain predictive drift models characterizing the drift of each pair of nodes in a mesh network relative to each other. Alternatively, the leader node and/or remote server can compress the pairwise predictive drift models and instead maintain a single predictive drift model for each node in the mesh network relative to the clock at a leader node in the mesh network or a time standard accessed at a remote server.

In one implementation, the method S100 includes periodically adjusting a node's clock time between synchronization cycles according to the output of the predictive drift model (e.g. updating the node's clock value every millisecond according to the predicted drift at the node). Alternatively, the system can calculate an estimate for the relative time bias of a node between synchronization cycles based on the predictive drift model of the node.

Furthermore, the method S100 can include adjusting the duration of a subsequent synchronization slot according to the output of the predictive drift model. Furthermore, the method S100 can include triggering the inclusion of a synchronization slot in a TDMA frame in response to a predicted drift value being greater than a predefined drift threshold (e.g. triggering the inclusion of a synchronization slot in the TDMA frame when the predicted drift model predicts greater than one nanosecond of drift between the follower node clock and the leader node clock).

The predictive drift model can be a combination of a set of physical models representing pertinent environmental parameters. In one implementation, the predictive drift model includes a temperature model for drift as a function of temperature and crystal cut. The temperature model can include a set of approximate models, each model relating drift (e.g. in parts-per-million) to temperature for a corresponding crystal cut. In one implementation, the method S100 can include classifying the crystal oscillator of each node according to observed temperature drift over multiple synchronization slots to select a polynomial approximation of temperature drift associated with a particular node as a function of time.

The predictive drift model can also include predictive models for thermal hysteresis, ambient pressure, humidity, electric and/or magnetic field strength, drive level for the crystal oscillator, and/or reference voltage for the crystal oscillator.

In one implementation, the predictive drift model can output a confidence interval for expected drift based on randomly distributed phase noise in a crystal oscillator and systematic drift. The predictive drift model can calculate a distribution of phase noise for the crystal oscillator based on factors such as reference source noise, power supply noise, vibration induced noise, and/or acceleration induced noise.

Thus, the system can execute successive iterations of the method S100 for a node in the mesh network and record a time series of relative time biases between the node and a reference time, which can be a time maintained at a leader node or a remote server. Concurrently, the system can record a time series of environmental data from the node. The system can then correlate the time series of environmental data with the time series of time biases to predict the drift of the time bias of the node based on changes in the environmental data. In this manner, the system can calculate a temperature correlation between the temperature at a particular node and the drift rate exhibited by the node based on a time series of temperature data and a time series of time biases of the node. Additionally or alternatively, the system can calculate a movement correlation between the movement of a node (e.g., acceleration measured by an IMU at the node) and the drift rate exhibited by the node based on a time series of movement data and a time series of time biases of the node.

In yet another implementation, the system can detect the movement of a node by recording a time series of the propagation delays between one node in a mesh network and other nodes of the mesh network. Thus, the system can: calculate a first relative location of a node based on a first propagation delay calculated during a first iteration of the method S100; calculate a second relative location of a node based on a second propagation delay calculated during a second iteration of the method S100; and calculate a movement correlation of drift of the clock of the node based on the first relative location, the second relative location, the first time bias, and the second time bias In one implementation, the system can: calculate the time bias uncertainty for a recently calculated time bias of a first node relative to a second node; predict the drift magnitude of the time bias at the node based on a predictive drift model; predict a change in the propagation delay between the first node and the second node based on motion data from the first node and the second node; and set a synchronization slot duration equal to a sum of the time bias uncertainty plus the drift magnitude plus the propagation delay plus the change in the propagation delay. Therefore, the system can ensure reception of subsequent synchronization signals transmitted between a node pair by accounting for relative drift between a pair of nodes in the mesh network.

1.11 Resynchronization Triggers

One variation of the method S100 includes, triggering the inclusion of one or more synchronization slots within a subsequent TDMA frame based on the output of the predictive drift model or the detection of an environmental change. In one implementation, the method S100 includes triggering the inclusion of a synchronization slot upon the predictive drift model outputting a predicted drift magnitude greater than a threshold drift value (e.g. greater than ten nanoseconds of drift since the last synchronization slot). Alternatively, the method S100 can include triggering the inclusion of a synchronization slot based on observed temperature change (e.g. via a digital thermometer at the node) and/or acceleration or vibration data (e.g. via IMU data collected at the node). Furthermore, the method S100 can include triggering the inclusion of a synchronization slot based on movement of one node relative to another. The method S100 can include detecting movement via an IMU at the node, a measurement of the doppler shift for incoming signals from the node, or via multilateration between the nodes.

In one example, the system can: after an initial iteration of the method S100, measure a temperature at a first node in the node pair; calculate a time bias drift based on the temperature and a temperature drift model; and schedule a synchronization slot in the next TDMA frame based on the time bias drift.

Generally, when method S100 triggers the inclusion of a synchronization slot, the synchronization slot is included in the subsequent TDMA frame and indicated in the header of the TDMA frame.

2. Methods For Localization of Transmitters

Figure 6A:
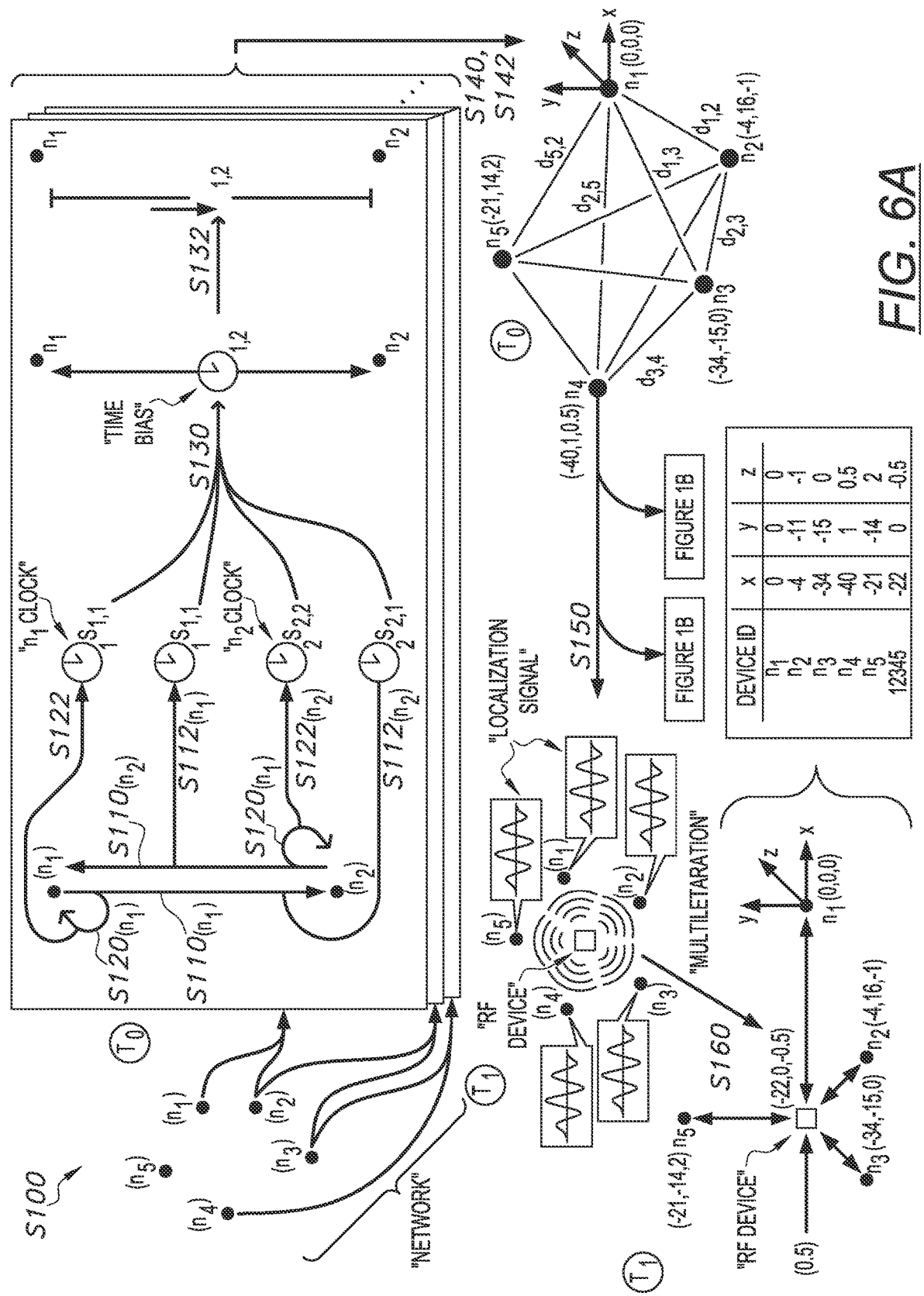
FIG. 6A is a flowchart representation of a second method.

As shown in FIG. 6A, a method S200 for detecting a location of a device via a network includes, at each node in each unique pair of nodes in a network: transmitting an outbound synchronization signal in Block S210; generating a self-receive signal based on the outbound synchronization signal in Block S220; detecting the self-receive signal at a self-receive time-of-arrival (hereinafter "TOA"), in a pair of self-receive TOAs in Block S222; and detecting an inbound synchronization signal, transmitted from an opposing node in the unique pair of nodes, at a synchronization TOA, in a pair of synchronization TOAs in Block S212. The method S200 also includes, based on the pair of self-receive TOAs and the pair of synchronization TOAs, for each unique pair of nodes in the network: calculating a pairwise time offset, in a set of pairwise time offsets, between the unique pair of nodes in Block S230; and calculating a pairwise distance, in a set of pairwise distances, between the unique pair of nodes in Block S232. The method S200 further includes, for each node in the network: based on the set of pairwise distances, calculating a relative location of the node in the network relative to one node in the network in Block S240; and based on the set of pairwise time offsets, calculating a time bias of the node in the network relative to one node in the network in Block S242. The method S200 also includes: at each node in the network, detecting a localization signal, transmitted by a device, at a localization TOA in Block S250; and calculating a location of the device relative to the network based on, for each node in the network, the localization signal detected at the node, the time bias of the node, and the relative location of the node in Block S260.

Figure 6B:
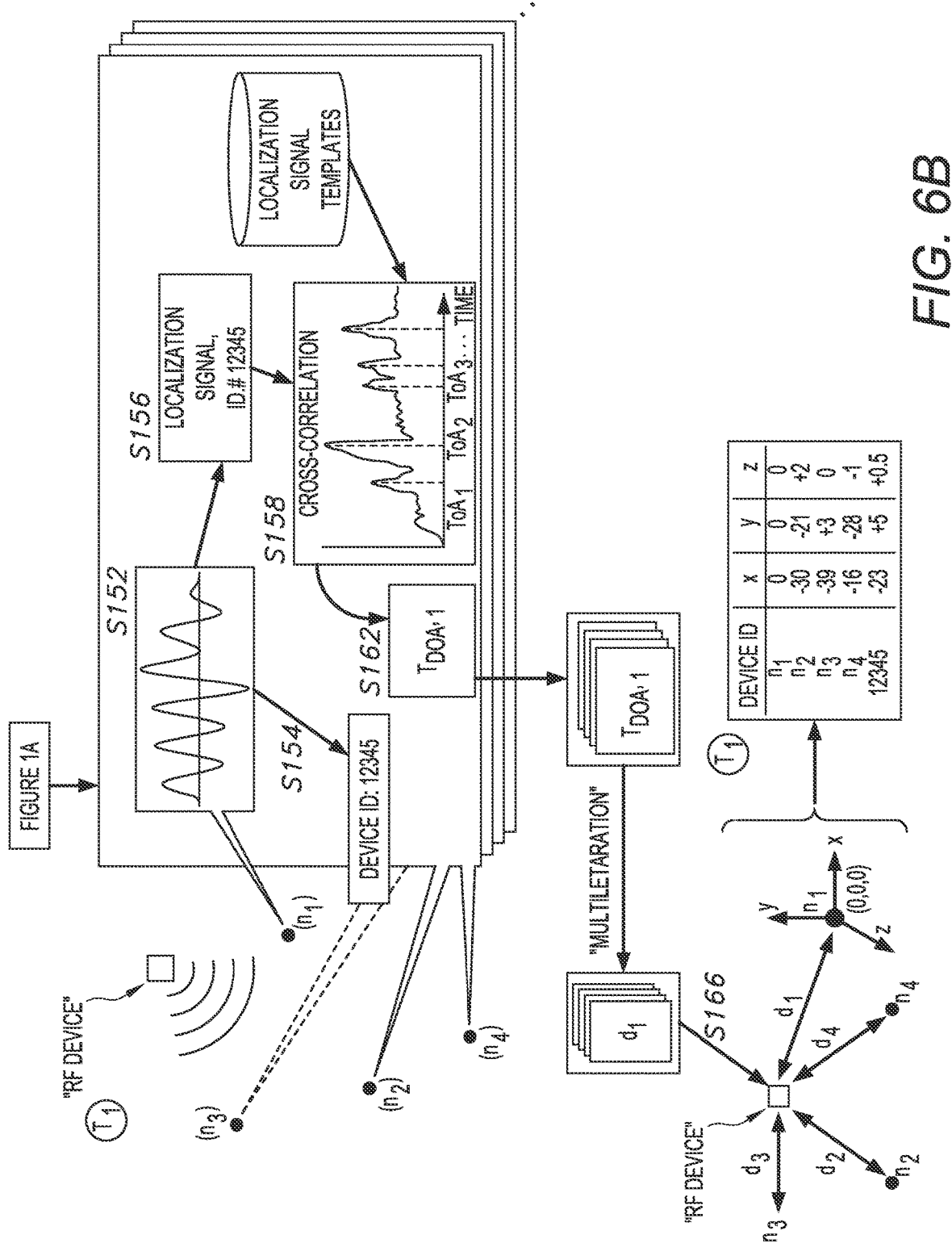
FIG. 6B is a flowchart representation of one variation of the second method.

As shown in FIG. 6B, a first variation of the method S200 includes, at each node in the network, each node characterized by a location relative to the network and a synchronized clock relative to a clock of the network: receiving a carrier wave on a multiplexed channel in Block S252; demodulating the carrier wave to detect an identifying signal transmitted by a device in Block S254; detecting, in the carrier wave, a set of localization signals resulting from multipath propagation of the carrier wave in Block S256; and for each localization signal in the set localization signals, calculating a localization TOA, in a set of localization TOAs, of the localization signal in Block S258. The first variation also includes: for each node in the network, selecting a line-of-sight (hereinafter "LOS") TOA from the set of localization TOAs of the node in Block S262; calculating a set of time-differences-of-arrival (hereinafter "TDOAs") based on the LOS TOA for each node in Block S264; and calculating a location of the device based on the set of TDOAs in Block S266.

Figure 6C:
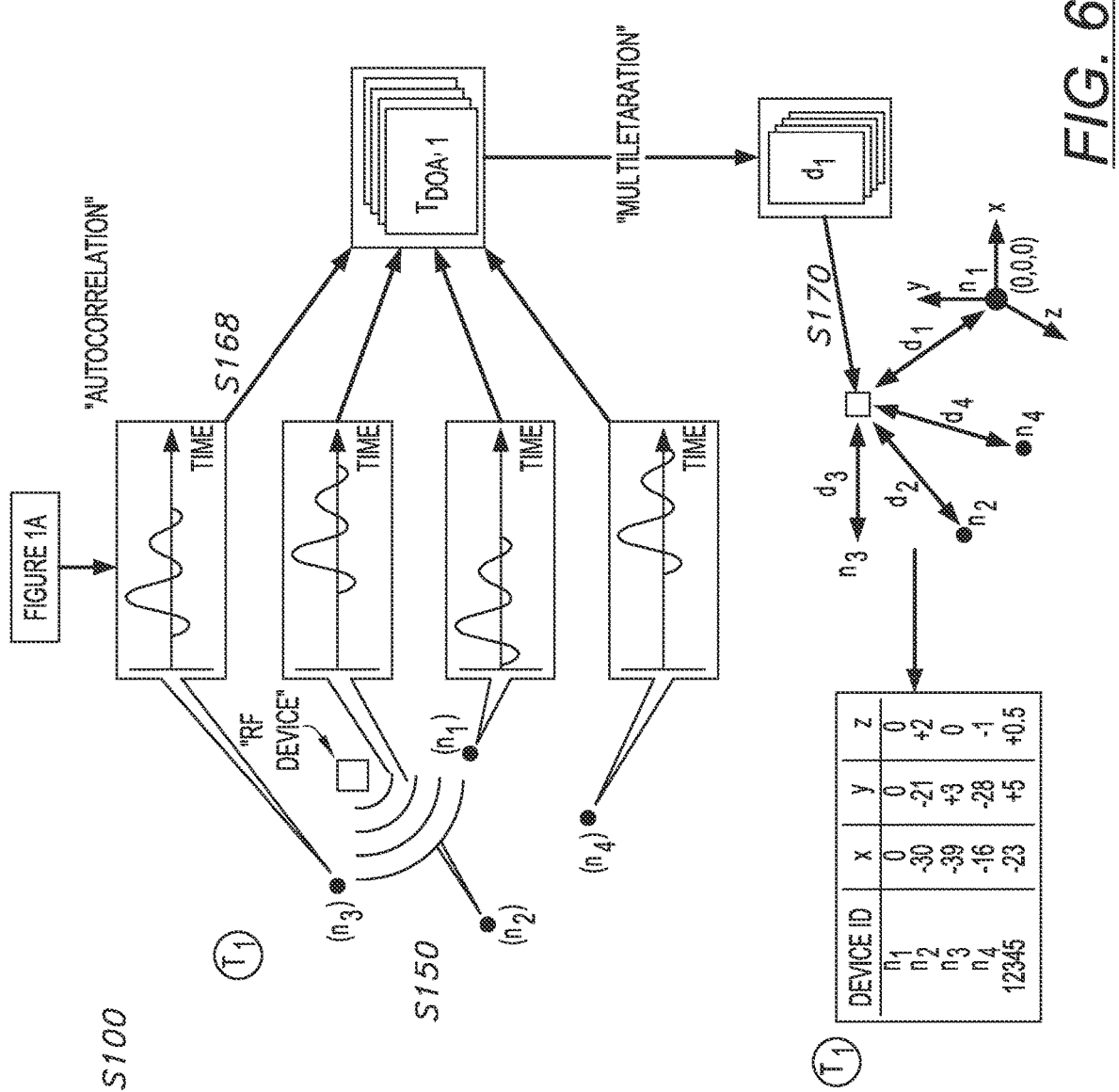
FIG. 6C is a flowchart representation of one variation of the second method.

As shown in FIG. 6C, a second variation of the method S200 includes, at each node in a network: transmitting an outbound synchronization signal in Block S210; generating a self-receive signal based on the outbound synchronization signal in Block S220; detecting the self-receive signal at a self-receive TOA in Block S222; and for each inbound synchronization signal in a set of inbound synchronization signals received from other nodes in the network, detecting a synchronization TOA, in a set of synchronization TOAs, of the inbound synchronization signal in Block S212. The second variation also includes, for each node in the network, based on the self-receive TOA and the set of synchronization TOAs: calculating a time bias of the node relative to one node in the network in Block S242; and calculating a pairwise distance, in a set of pairwise distances, between the node and each other node in the network in Block S232. The second variation further includes: based on the set of pairwise distances, calculating relative locations of nodes in the network in Block S240; at each node in the network, detecting a localization signal, transmitted by a device in Block S250; for each node in the network, calculating a TDOA for the node based on the localization signal detected at each node in Block S268; and calculating a location of the device relative to the network based on the relative locations of nodes in the network and, for each node in the network, the TDOA of the node, and the time bias of the node in Block S270.

2.1 Applications

Generally, the method S200 is executed by a system including a network (e.g., a mesh network) of nodes and/or remote servers in order to estimate locations of radio-frequency (hereinafter "RF") transmitting devices relative to the network of nodes, such as to within 30 centimeters. The system can estimate the location of (or "localize") a RF transmitting device within RF range of the network of nodes without prior information regarding the position of the nodes, without a requirement that nodes in the network be stationary, without precise calibration (e.g., temporal, gain, and/or frequency calibration) of the nodes, and with each node including a standard electronic clock (e.g., a crystal oscillator clock). Each node in the network can include networking hardware, such as an antenna, transceiver hardware, an FPGA/DPS, a clock, and self-receive signal generator (e.g., an impedance mismatched directional coupler, RF power splitters, combiners, circulators, etc.) further described below.

The system can execute Blocks of the method S200 to localize an RF transmitting device that is detectable by nodes in the network (e.g., at least three nodes for two-dimensional localization, at least four nodes for three-dimensional localization). More specifically, the system can identify and localize third-party devices—such as RFID-, ZIGBEE-, BLUETOOTH-, WIFI-, AND/OR LTE-enabled devices—without necessitating changes to the transmission protocols executed by these devices. Additionally or alternatively, the system can localize specifically designed devices (e.g., active tags) configured to transmit specific localization signals to the nodes in the network.

In order to obtain sub-meter localization accuracy, the system executes a calibration and synchronization process to obtain nanosecond level clock synchronization between nodes in the network by identifying the time offset between each unique pair of nodes in the network. The system can then calculate the relative time bias of the nodes in the network and can compensate for the calculated time biases. By executing the calibration and synchronization processes, the system can also calculate the propagation delay, and therefore the distance between each unique pair of nodes in the network. Once the system has calculated the distance between nodes, the system can establish the relative location of each node in the network given enough total nodes (e.g., at least five nodes for three-dimensional relative location). Thus, if the global location of one of the nodes is known, the system can determine the global location for all other nodes in the network.

The system can then leverage the calculated location information and time synchronization of each node in the network to precisely localize any RF transmitting devices within RF range of the network. The system can uniquely identify an RF transmission (e.g., in the form of a carrier wave) from a device as the RF transmission is received at each node in the network. In one implementation, each node can precisely calculate the TOA of the RF transmission as it propagates to each node. The system can then compare the TOA from each node in the network to calculate a TDOA of the received signal between each node. Alternatively, the nodes can transmit a portion of the received signal to a remote server and/or one of the nodes in the network (e.g., a leader node) and determine a TDOA of the received signal via cross-correlation of received signals. The system can then execute a multilateration calculation to estimate the location of the device.

The system can also resolve superposed repetitions of an RF transmission from a device caused by multipath propagation of the RF transmission. After resolving the individual multipath signals the system can individually determine the TOA or TDOA of each multipath signal and then select the LOS TOA or TDOA representing the LOS RF transmission between the device and each node. By eliminating multipath artifacts in the RF transmission, the system can better localize devices in complex propagation environments. The system can execute the aforementioned multipath detection and rejection by utilizing frequency, time, phase, space, and/or orientation diversity, which can be applied at the transmitting end (e.g., by specifying, via a custom protocol, the RF transmissions of devices), the receiving end (e.g., via specialized reception and processing at each node), and/or on the backend (e.g., in post-processing at a leader node and/or a remote server).

A system executing Blocks of the method S200 can be deployed for a wide variety of applications. In one example, the system is locally deployed within a warehouse, shop, medical facility, and/or any other building. The network of nodes of the system can be deployed locally around the building such that asset tracking RF tags (active tags), mobile phones, BLUETOOTH, WIFI devices etc. can be localized and tracked within the building. In another example, the system can be deployed as a telecommunication network, wherein each node in the network is a cellular site that can localize, send, and receive signals from cellular devices. In yet another example, the system can be deployed as a network of low-earth-orbit (hereinafter "LEO") satellites, which can localize RF transmissions from large volumes of space on or above earth's surface.

2.2 Telecommunication Deployment

Generally, the method S200 can be executed by a telecommunication network including cellular networks executing LTE, 4G, 5G, and 5G NR standards as maintained by the Third Generation Partnership Project (hereinafter "3GPP"). For example, the method S200 can be executed by nodes in a cellular network, such as by 5G Radio Nodes (hereinafter "gNB") and/or by Enhanced 4G eNodeBs (hereinafter "ng-eNB"), as a component of the server-side Location Management Function (hereinafter "LMF") and/or the Access and Mobility Management Function (hereinafter "AMF").

2.3 System

The system executing the method S200 can include a network (e.g., a mesh network) of nodes, a remote server, and/or active tags or controllable devices (i.e. non-third-party) devices. The nodes in the network are RF transceivers that execute Blocks of the method S200 that involve transmitting or receiving signals between nodes or from a device. Generally, Blocks of the method S200 that do not involve receiving or transmitting signals can be performed on a node and/or a remote server that can execute Blocks of the method S200 via an internet connection (i.e. "in the cloud") with the nodes in order to reduce processing load at the nodes. Furthermore, the system can include various devices that are configured to interact with the nodes in order to be localized by the signals. These "controllable devices" can include a smartphone or other transmitter configured to transmit specific localization signals such that the device can be more easily detected and localized by the system.

2.4 Nodes

As shown in FIGS. 3A and 3B, the system includes a network of nodes. The network can include two or more nodes, although the more nodes that are included in a network the greater the accuracy of the localization of both the nodes and the devices within RF range of the network of nodes. In one implementation, the network includes three nodes and can localize a device in two-dimensional space. Alternatively, the network includes four nodes and can localize a device in three-dimensional space. In yet another implementation, the network includes five nodes and can localize each node based on the propagation time measured from each of the other four nodes in the network. Thus, the functionality of the system improves upon the inclusion of a greater number of nodes in the system.

Generally, nodes include transmission components and receiver components, an FPGA or DSP configured to generate and process signals, a clock, and a self-receive signal generator. The nodes transmit and receive information wirelessly and, as such, include RF transceiver hardware such as a super heterodyne radio architecture and an Rx/Tx antenna shown in FIG. 3A. In this implementation, each node includes a "receive chain" and a "transmit chain." The receive chain includes a pipeline of hardware components that process signals received from the Rx port. The transmit chain includes a pipeline of hardware components that process transmission signals generated by the FPGA or DSP and feed them into the Tx port. The receive chain and the transmit chain impart a "receive chain delay" and a "transmit chain delay" respectively. "Receive chain delay" and "transmit chain delay" describe the amount of time elapsed as a signal traverses either the receive chain or the transmit chain respectively.

In one implementation, the nodes can also communicate with a remote server over a wired network. In this implementation, the nodes can include an I/O port and/or appropriate interface converters for communicating over any wired medium (e.g. ethernet/twisted-pair, coaxial, or fiber optic).

In one implementation, a node is integrated within extant transceiver infrastructure such as a cellular site that has been adapted to execute the method S200. A cellular site/tower or other extant transceiver can be adapted to execute the method S200 by updating the software of the cellular site. In alternate implementations, the nodes can include optimized hardware to improve aspects of the method S200.

In one implementation, the FPGA or DSP of each node is configured to generate complex digital signals and output the generated signals to a DAC. The complex components of the digital signals represent the in-phase and quadrature portions (i.e. I/Q) of the analog signal to be generated by the DAC. Additionally, the FPGA or DSP of the node receives digital signals from the antenna of the node via an ADC and timestamps received synchronization signals according to an instant value of the clock and a TOA calculation process described below.

Each node also includes a clock, such as a crystal oscillator clock or an atomic clock, which may be responsible for time-keeping and timestamping functions at the node. The system can execute the method S200 to synchronize clocks across multiple nodes within a network in order to localize devices. In particular, the system can effectively synchronize crystal oscillator clocks that satisfy basic frequency stability, phase noise, and frequency requirements for wireless communication. In one example, the clock is a quartz crystal oscillator with an AT cut and a clock frequency of ten megahertz. However, a node can include a crystal oscillator of any frequency or cut assuming the aforementioned constraints are met.

Each node includes a self-receive signal generator 110, which generates a self-receive signal in Block S220. Generally, the self-receive signal generator feeds an attenuated copy of the synchronization signal being transmitted to another node back into the receiving port of the sending node. By processing the transmitted synchronization signal via the receive chain and determining a TOA and/or a phase reference for the self-receive signal, each node is able to timestamp transmitted signals delayed by the receive chain delay (i.e. the time delay incurred by a signal as the signal is processed by the receive chain). When the node later receives a synchronization signal from another node, the TOA or POA of the synchronization signal will also have the same receive chain delay. Because the TOA and/or POA of the self-receive signal and the TOA or POA of the synchronization signal both include the receive chain delay, they can be directly compared without precise calibration of the receive chain hardware.

In one implementation, the self-receive signal generator is a directional coupler shown in FIG. 3B. The self-receive signal generator can also include a variable impedance circuit, which may be software controlled to vary the gain of the reflected Tx signal into the Rx port. Depending on the specific hardware implementation of the node, similar impedance matching can be applied to circulators, power splitters, or any other transmission line device. However, the self-receive signal generator can include any software or hardware system for feeding a Tx signal into the Rx port.

In one implementation, each node can include a software-defined radio architecture performing the function of any of the hardware elements described above.

2.5 Devices

The system executes the method S200 in order to localize devices. Generally, devices can include controllable devices and/or third-party devices. Although the system can localize either category of controllable device 106, the system can include specific optimizations that can improve localization of controllable devices. More specifically, controllable devices can include any device manufactured and/or configured (e.g., via firmware or software) to transmit specific RF signals (i.e. localization signals) that can be detected by the nodes in the network. In one implementation, controllable devices include "active tags," which can be low-power RF transceivers configured for an asset tracking application. In another implementation, controllable devices can include smartphones or any other device executing a software or firmware application that transmits localization signals to be detected by nodes in the network. In yet another implementation, the controllable devices include low power transmitters that cannot receive signals from the system and operate according to a predefined custom transmission protocol.

Third-party devices can include any device that produces RF transmissions at a sufficiently high power to be received at nodes in the network. Generally, third-party devices communicate wirelessly by executing standardized wireless protocols, such as BLUETOOTH, WIFI, LTE, 5G and/or any other wireless protocol that can be detected via a node-executing packet analysis techniques. Although, the third-party devices may not transmit localization signals as defined by the system, any identifiable RF transmission can be considered a localization signal for a third-party device. For example, the system can detect a periodic LTE and/or 5G synchronization sequence received from a particular device as a localization signal for that device.

However, the system can localize any RF-emitting device that can be detected at a sufficient number of nodes in the network.

2.6 Relative Localization of Nodes in the Network

Generally, in Block S240, the system can calculate the relative location of each node in the network based on the pairwise distance between each unique pair of nodes in the network. Furthermore, the system can calculate a global location of each node in the network given a global location of a reference node in the network and locations of the other nodes in the network relative to the reference node. More specifically, a system including at least four nodes can calculate the relative three-dimensional location of each node in the network based on pairwise distances between each node in the network. Similarly, a system that includes four nodes can calculate the relative two-dimensional location of each node in the network based on the pairwise distance between each node. In one implementation, the system includes greater than five nodes and improves the accuracy of the relative location calculations via measurement redundancy/overdetermination.

The system can determine the relative location of each node in the network by defining an origin of a coordinate system at a first reference node and an axis of the coordinate system through a second reference node in the network. Alternatively, the system can define the coordinate system based on three reference nodes forming a two-dimensional plane. The system can then solve a set of self-consistency equations for the pairwise distances in the network. The self-consistency equations are of the following form:

$$(x_i-x_j)^2+(y_i-y_j)^2+(z_i-z_j)^2=d_{i,j}^2$$

for each unique pair of nodes $n_i$ and $n_j$ in a network of nodes. The system can solve the self-consistency equations via iterative or stochastic methods because the system of self-consistency equations cannot be solved deterministically given the error in the calculation of the pairwise distances between nodes and/or, in some circumstances, the overdetermination of the system of self-consistency equations. Additionally, the system can incorporate any additional positional information to further constrain the system of self-consistency equations and improve the calculation of the location of each node in the network.

However, the system can implement any mathematical technique to convert the set of pairwise distances between nodes in the network to a relative location of each node in the network.

2.7 Device Localization

Generally, the system executes a combination of Blocks S250, S252, S254, S256, S258, S260, S262, S264, S266, S268 and/or S270 to localize devices within RF reception range of a sufficient number of nodes in the network. More specifically, the system can: receive signals in the form of carrier waves in Block S252; disambiguate signals from multiple devices in a crowded wireless environment;

uniquely identify a device based on a disambiguated signal in Block S254; calculate a set of TDOAs of a signal from the device between nodes in the network; and perform TDOA multilateration to localize the device in Block S258. Additionally, the system can also detect multipath artifacts of the signal from the device and select a LOS signal from the set of multipath signals. Furthermore, the system can perform statistical denoising and TDOA bounding to improve localization accuracy.

2.7.1 Signal Disambiguation

In order to disambiguate specific signals from general RF noise and/or other interfering signals, the nodes execute one or more wireless protocols to detect devices also communicating via those protocols. The system can execute variations of standardized wireless protocols including various versions of IEEE 802.15.4, BLUETOOTH, WIFI, GSM, CDMA, LTE, and/or 5G protocols or any other standard wireless communication protocol. Additionally, the system can execute custom wireless protocols specifically designed for localization of devices via a network of nodes. Both standardized wireless protocols and custom wireless protocols can implement one or more forms of multiple access structure such as TDMA, frequency division multiple access (hereinafter "FDMA"), code division multiple access (hereinafter "CDMA"), or some hybrid or variant thereof. Thus, the system can also implement these multiple access techniques to disambiguate transmissions from different devices. Once a node in the network has accessed a multiplexed channel, the node records samples of a carrier wave transmitted from a device via the receive chain and Rx port of the node. Thus, in Block S254, the node can then demodulate the carrier wave to identify signals transmitted from a device.

The system can localize third-party devices and controllable devices such as active tags. As such, the demodulated signal can include a specific localization signal (e.g., from a controllable device) that is specially configured for calculation of a TOA, TDOA, POA, or phase difference of arrival (hereinafter "PDOA") by the system. Additionally, a controllable device can also be configured to transmit an identification signal in addition to a localization signal such that the system can more easily identify the device and associate the calculated location of the device with previously calculated locations of the device. However, if the demodulated signal is received from a third-party device operating a standardized wireless protocol, then the demodulated signal may not include specific localization signals for calculating TOA, TDOA, POA, or PDOA of the signal. Instead the system can identify and localize the device based on particularly identifiable and localizable transmissions specified by the standardized wireless protocols.

2.7.2 Custom Protocols

In one implementation, the system localizes a controllable device via a custom wireless communication protocol. A custom wireless communication protocol can: specify the multiple access method utilized to disambiguate signals from different controllable devices; specify the structure of an identification signal used to establish a unique identity of a controllable device; and specify the structure of a localization signal sent from a controllable device such that the system can calculate a TOA or a TDOA of the localization signal at each node in the network. In one implementation, a custom wireless protocol specifies an adjustable wireless protocol such that the system can instruct controllable devices to change the channel (in the multiple access method) and/or the timing, duration, format, or structure of the localization or identification signals of the device.

2.7.2.1 Localization Signal Structure

Generally, the localization signal for controllable devices includes a pseudorandom sequence that exhibits a high peak autocorrelation when aligned compared to when not aligned. In one implementation, the localization signal is a Zadoff-Chu sequence.

In implementations in which the controllable devices are one-way transmitters and cannot receive signals from the system (e.g., certain implementations of active tags), the localization signal can include a single static pseudorandom sequence preassigned to each controllable device. The controllable device can then periodically transmit the preassigned sequence such that the nodes can localize the controllable device.

In an alternative implementation, wherein controllable devices are configured to receive signals from the system, the system can transmit instructions to the controllable device specifying the localization signal for the controllable device to transmit. Additionally, the system can communicate synchronization, timing, or channel information to the controllable device such that the controllable device can transmit at a time and on a channel specified by the system, thereby enabling consistent reception of localization signals from the device by the nodes in the network in a variety of wireless propagation environments.

In another implementation, the controllable devices are configured to transmit localization signals over multiple bands in order to mitigate the effects of multipath fading and improve the probability of detecting and calculating a TOA or a TDOA of the LOS signal for each node in the network. For example, the controllable devices can be configured to transmit a localization signal over multiple carrier frequencies via frequency-division multiplexing (hereinafter "FDM"). Additionally or alternatively, the controllable devices can transmit the localization signal in multiple time-division multiplexed (hereinafter "TDM") slots, thereby improving time diversity in the localization signal.

In yet another implementation, the controllable devices are configured to transmit localization signals similar in structure to the synchronization signals described above with reference to Blocks of the method S100. In this implementation, each controllable device can transmit a localization signal implemented according to any variation of the synchronization signal described above.

2.7.3 Standardized Protocols

In one implementation, the system localizes a third-party device via a standardized wireless communication protocol such as ZIGBEE, BLUETOOTH, WIFI, GSM, CDMA, and/or LTE, etc. Although a standardized wireless protocol may not explicitly specify a localization signal or an identification signal in transmissions between communicating devices, standardized wireless protocols frequently require devices utilizing the protocol to identify the transmitting devices' initial communications and communicate on particular multiplexed channels such that the devices can consistently transmit signals to the correct device. Additionally, many standardized wireless protocols leverage pseudorandom sequences in the protocol for various purposes other than localization.

Thus, the system can execute a TDMA protocol that detects these localizable sequences and can localize devices transmitting via standardized wireless protocols by intercepting transmissions the device would otherwise make during normal operation. For example, the LTE and 5G protocols specify pseudorandom (Zadoff-Chu) sequences in the physical uplink control channel (PUCCH). The nodes in the network can be configured to detect this sequence and use it as a localization signal for a particular LTE or 5G device. Similar methods can be applied to other periodically broadcasted synchronization and control sequences in other standardized wireless protocols. Therefore, the localization signal can include a standardized wireless protocol communication.

2.7.4 Multiple Protocol Stack

The system can localize devices transmitting according to any of multiple standardized wireless protocols. In one implementation, the system does not implement the full protocol stack of each standardized protocol included in the multiple protocol stack. In this implementation, the system can implement the parts of each standardized protocol for demodulating the physical waveform into symbol or bit streams. Additionally or alternatively, the system can implement parts of standardized protocol stacks relevant to demultiplexing transmissions from multiple devices. For example, the system can demultiplex signals sent by a device transmitting according to a standardized wireless protocol by using control/header frames or by exploiting the time separation of the transmissions. After demultiplexing the received signals, the system can extract metadata such as protocol description and transmission parameters in order to identify and/or localize a device.

2.7.5 Device Identification and Tracking

The system can also identify and track various localized devices as they move relative to the network. In one implementation, the system can associate a device with an identifier, based on an identifying signal transmitted by the device; and associate subsequently received signals from the device with the identifier. If the device is executing a custom wireless protocol, the protocol can specify a unique and identifiable localization signal or an identification signal such that any transmission made by the device can be identified as having been transmitted from the device. Alternatively, if a device is executing a standardized wireless protocol, the system can implement a multiple access scheme based on each device transmitting identifying information in the process of executing the standardized wireless protocol.

In an alternative implementation, the system can interface with a hub or computational device that is coordinating a standardized wireless protocol (e.g., a leader node in a BLUETOOTH piconet or an eNode-B cellular site for LTE or 5G) in order to identify the multiplexed channels on which various devices are transmitting. The system can then identify any transmission received on the multiplexed channel at the expected time as having originated at a device specified by the wireless hub or leader node.

In yet another implementation, the nodes in the network themselves can execute the standardized wireless protocol and localize devices communicating with the node. For example, the nodes themselves can operate as eNode-B cellular sites and can execute the LTE or 5G protocol. Thus, each of the nodes, in the process of operating the LTE or 5G protocol, will have information detailing the identity and channel information for each device that is communicating with the node. The system can utilize this information at other nodes in order to localize the device.

Once the system identifies a device, the system can assign an internal identifier to the device and associate any calculated or estimated location information for the device with the identifier, such that location and path of the device can be tracked relative to the nodes in the network.

2.7.5.1 Adaptive Protocols and Collision Detection

In one implementation, the system can also track and/or predict the clock drift of devices being localized by the system relative to the synchronized clocks of the nodes by identifying transmissions from the device with a device identifier. Generally, the system can characterize a clock drift of the device based on a time difference between localization TOAs of subsequently received signals from the device relative to boundaries of a transmission slot defined by a wireless protocol; and modify the first standardized wireless protocol based on the clock drift of the device. Additionally, the system can estimate, based on the location of the device over multiple of the subsequently received signals, a predicted clock drift of the device; and modify the first standardized wireless protocol based on the predicted clock drift of the device.

Thus the system can anticipate, based on the drift rate of the clock of a device, a time at which the device will no longer be transmitting within the TDMA slot specified by the wireless protocol. In one implementation, the system can adjust the bounds of the TDMA frame to accommodate the drift of the device's clock. Alternatively, if the device is a controllable device, the system can send a synchronization signal to realign the clock of the device with the node clocks. In yet another implementation, the system can instruct a device to transmit via a different carrier frequency such that signals from multiple devices can be interpreted within the same TDMA slot.

However, the system can modify the TDMA frame structure in any way to accommodate collisions an disambiguate collided signals within a single TDMA slot.

2.8 TDOA Calculation

Generally, in Blocks S266, and S268 the system can, for each node in the network, calculate a TDOA for the node based on the localization signal detected at each node. More specifically, the system can calculate a TDOA of a localization signal directly from the localization signals themselves or by first calculating an accurate TOA at each node (by compensating for the previously calculated time bias of each node) and subtracting the earliest TOA at the first node to receive the signal from each of the TOAs for the other nodes. Thus, the system can, for each node in the network, adjust the localization TOA (i.e. the TOA of a localization signal) at the node, in a set of localization TOAs, by the time bias of the node.

In implementations wherein the system calculates TDOAs for nodes directly based on the received localization signals, each node can transmit timestamped localization signals as received at the node to a leader node or remote server. The system can then cross-correlate the localization signals on a pairwise basis to generate a set of TDOAs for the localization signal at each node in the system. In these implementations, the system compensates for systemic offsets (e.g., time bias and frequency offset) between each pair of nodes when calculating the cross-correlation between the localization signals received at each of the nodes.

In an alternative implementation, the system individually calculates TOAs for the localization signal at each node and then subtracts the calculated TOA values to determine a set of TDOA values. In calculating a TOA of a localization signal, the receiving node can auto-correlate the received localization signal with a template localization signal to determine a timestamp corresponding to the peak value of the auto-correlation function. Localization signals can include specifically chosen sequences that have a high autocorrelation value when the sequences are aligned and a low autocorrelation value otherwise. In one implementation, each node performs digital autocorrelation between received signals and template signals. Alternatively, each node performs analog autocorrelation between an analog conversion of the digital synchronization signal and the template signal. The latter accounts for time durations between samples in addition to the value of the samples.

If the system calculates TDOA of the localization signal between each unique pair of nodes, then the system can perform statistical techniques such as averaging to utilize the redundant TDOAs to improve the TDOA estimate. For example, given three nodes $n_1$, $n_2$, and $n_3$, the system can calculate the TDOA between $n_1$ and $n_3$ directly either by cross-correlation of the localization signals received at nodes $n_1$ and $n_3$ or by subtracting TOAs calculated at nodes $n_1$ and $n_3$ or the system can calculate the TDOAs between $n_1$ and $n_2$ and between $n_2$ and $n_3$ and sum them to find another value for the TDOA between $n_1$ and $n_3$. The system can apply statistical techniques on the overdetermined TDOA values to improve the accuracy of TDOA calculations.

2.8.1 Phase-Based Localization

In implementations wherein the device transmits a localization signal over multiple carrier frequencies, the system can also localize transmitting devices based on the POA of localization signals by recording the carrier phase offset of the received localization signal for each transmitted carrier frequency in a FHSS localization signal. Generally, the system can, at each node in the network, calculate a set of carrier phase offsets for each carrier frequency of the localization signal detected at the node to generate a set of carrier phase offsets of the localization signal detected at the node; and calculate the location of the device relative to the network based on, for each node in the network, the set of carrier phase offsets of the localization signal detected at the node, the time bias of the node, and the relative location of the node. More specifically, the system can measure multiple-frequency PDOA to improve localization of devices.

2.9 Multipath Detection

In Blocks S252, S256, S258, S262, S264, and S266 the system can: detect in a carrier wave a set of localization signals resulting from multipath propagation of the carrier wave; for each localization signal in the set localization signals, calculate a localization TOA in a set of localization TOAs of the localization signal; for each node in the network, select a LOS TOA from the set of localization TOAs of the node; calculate a set of TDOAs based on the LOS TOA for each node; and calculate a location of the device based on the set of TDOAs.

The system calculates the TOA for a superposed localization signal in a similar manner to the calculation of a TOA for a single localization signal. However, instead of performing a digital autocorrelation on the demodulated signal, the system can apply a cross-correlation function of a template for the analogue signal corresponding to the modulated localization signal and the analogue signal as received at the node. In a multipath environment, the autocorrelation function can output multiple peaks, which each correspond to the TOA of a multipath component of the localization signal. A common method for determining the LOS TOA from the set of multipath TOAs is to simply select the earliest TOA from the set of TOAs detected at the node as the LOS TOA. However, this method is susceptible to artifacts resulting from wireless signal propagation. This may result in the estimation of an incorrect LOS TOA. Instead the system can employ a variety of techniques leveraging localization signals over multiple frequency bands to exploit frequency, time, and/or space diversity in the localization signal in order to reject multipath signals and estimate the LOS TOA from a set of TOAs.

2.9.1 Frequency-Based Multipath Detection

In one implementation, the system receives a localization signal transmitted over multiple frequency bands. As such, the localization signal includes a superposition of carrier waves at different frequencies, which can be frequency-modulated versions of the same pseudorandom sequence. Because RF waves at different frequencies propagate differently through a physical environment, the timing of a set of localization TOAs resulting from the set of multipath signals received at each node may vary depending on the frequency band on which the localization signal was transmitted. However, the LOS TOA is the same (within a threshold) across frequency bands. As such, the system can reject localization TOAs in the set of localization TOAs, which are not repeated across a threshold number of frequency bands. The system can determine that two localization TOAs between frequency bands are sufficiently concurrent to consider them "repeated" if they occur within a predetermined threshold time period. Additionally or alternatively, the system can determine a LOS TOA by choosing the earliest localization TOA between the set of all localization TOAs across frequency bands.

Thus, the system can: access a frequency-divided multiplexed channel comprising a set of carrier waves, each carrier wave characterized by a different carrier frequency; detect a set of localization TOAs for each carrier wave; compare the set of localization TOAs for each carrier wave and eliminate unrepetitive localization TOAs within a predetermined TOA threshold to generate a remaining set of TOAs; and select a LOS TOA for each node from the remaining set of TOAs from the node.

2.9.2 MIMO Multipath Detection

In one implementation, the system can achieve spatial diversity by utilizing multiple-input/multiple output (hereinafter "MIMO") multipath detection. In this implementation, nodes in the network are MIMO and include multiple antennas in different physical locations on the node. The displacement of the antennas relative to each other can be suitably small such that TOAs of localization signals are sufficiently similar across antennas, while the multipath signals received at each antenna are significantly different. In this implementation, each node records an incoming carrier wave including the modulated localization signal at each antenna of the node. The system then calculates a set of localization TOAs resulting from the multipath environment between the device and each antenna. The system can then eliminate localization TOAs that are not repeated across antennas in a similar manner to the above described process for frequency-based multipath detection. Alternatively or additionally, the system can select an earliest localization TOA, across the set of localization TOAs from all antennas, as the LOS TOA.

2.9.3 Time Domain Multipath Detection

In one implementation, the system can achieve time diversity by utilizing time domain multipath rejection. In this implementation, the device can transmit the localization signal periodically within a short time period at predetermined time offsets. As a result, each localization signal in the series of localization signals may encounter varying levels of interference in the multipath wireless environment. The system can then subtract the predetermined time offsets between each of the localization signals to align the localization signals and calculate a set of a localization TOAs for each localization signal. The system can then select the earliest detected localization TOA from across the time-separated localization signals as the LOS TOA.

2.10 TDOA Bounding

After the system has calculated a set of TDOAs at each node, the system can also apply TDOA bounding techniques to improve the likelihood of calculating an accurate TDOA between each pair of nodes in the network. The system can implement a bounding model to reject TDOAs that are inconsistent with prior information regarding the node's location or the scale of the area throughout which the nodes are distributed. Depending on the implementation, the system can perform TDOA bounding before or after calculating LOS TOAs. For example, the system can calculate all possible TDOAs between two nodes (by computing the difference between each TOA calculated at a first node with each TOA calculated at the second node) and then reject TDOAs outside of a bounding function. Alternatively, the system can first select LOS TOAs for each node and then reject TDOAs calculated based on the LOS TOAs. In implementations that include multi-banded localization signals, the system can apply TDOA bounding to either TOAs or TDOAs calculated across multiple bands. In one implementation, the system can reject TDOAs that correspond to a greater distance than the pairwise distance between the two nodes for which the TDOA was calculated. Additionally or alternatively, if the system is localizing devices within a known region, the TDOA bound can be decreased to reflect the maximum TDOA of a transmission originating from the known region.

2.11 Multilateration

After the system has calculated a TDOA for each pair of nodes in the network, the system can perform multilateration to: calculate a location of the device relative to the network based on, for each node in the network, the localization signal detected at the node, the time bias of the node, and the relative location of the node as in Block S260, S268, and S270. In one implementation, the system can calculate a number of locations for a device and define an area where the device may be located. Additionally or alternatively, the system can calculate a location of the device with an uncertainty in each dimension indicating the probable location of the device within a predetermined level of confidence. The system calculates the location of the device in the same coordinate system for which the relative location of each node in the network is known such that the location calculated for the device is also relative to the nodes. Generally, the system can calculate the two-dimensional relative location of a device with three nodes (of known location) in the network and the three-dimensional location of a device with four nodes (of known location) in the network. With TDOAs from a larger number of nodes (i.e. greater than four), the system can execute, the least squares method, and/or linear or non-linear optimization to refine the location of the device. Additionally or alternatively, Kalman filters or other filtering functions can be applied to the location estimate of a particular device over time.

The system executes multilateration by solving a system of equations of the form:

$$ct_{i,j} = \sqrt{(x_i-x)^2+(y_i-y)^2+(z_i-z)^2} - \sqrt{(x_j-x)^2+(y_j-y)^2+(z_j-z)^2}$$

where $t_{i,j}$ is the TDOA between nodes i and j; $x_i$, $y_i$, and $z_i$ are the coordinates of node i; $x_j$, $y_j$, and $z_j$ are the coordinates of node j; and x, y, and z are the coordinates of the device.

2.12 Deployment

The system can be deployed in a number of wireless networking scenarios as well as in any scenario involving wave propagation at a consistent speed between and amongst multiple nodes. Some examples of deployments of the system include a local asset tracking deployment, a telecommunication deployment, and a global satellite deployment.

2.12.1 Local Asset Tracking Deployment

The system can be deployed as an asset tracking system. In this implementation, the system can include a network of nodes placed around a warehouse, assembly line/factory, hospital, school, office building, or any other facility. The nodes can be distributed around the facility avoiding obstructions and ensuring that at least four nodes can receive localization signals from devices distributed throughout the facility (if three-dimensional location tracking is desired). The system can also include a set of active tags that can be attached to assets to be tracked and can transmit localization signals for reception by the nodes. Additionally, the local deployment can track other transmitting devices within or around the facility.

2.12.2 Telecommunication Deployment

The system can be deployed in a telecommunication setting, wherein each node comprises a cellular site and the network comprises a cellular network. The method S200 can be implemented in existing or retrofitted cellular sites. By leveraging the telecommunication infrastructure at a cellular site, the system's range can be increased and, therefore, the system can locate cellular devices or other transmitters within range of the cellular network. After calculating the location information of a cellular device, the system can then transmit the location information of a cellular device to the cellular device via the cellular network. Thus, the system can enable accurate location services for cellular devices in the cellular network.

2.12.3 Global Satellite Deployment

The system can be deployed as a global satellite network, wherein each node comprises a LEO satellite and the network comprises a geolocation system. The method S200 can be adapted to a global location tracking application by compensating for relativistic and atmospheric effects on the localization and synchronization signals. One advantage of a global satellite deployment of the system when compared to other global navigation systems is that the satellites executing the method S200 do not require continuous tracking and updating via an almanac. Instead each satellite acting as a node can repeatedly self-locate and time synchronize before localizing transmitters on or around earth. Thus, because the system does not require continual tracking or prior knowledge of the orbital positions/velocities, maintenance costs are reduced when compared to existing global navigation systems. A global satellite deployment of the system can localize transmitters anywhere on earth similar to GPS or other global navigation systems.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method comprising:
during a first time period:
at a first node:
transmitting a first synchronization signal; and
accessing a first reference phase of a first local reference copy of the first synchronization signal; and
at a second node, accessing a first phase of the first synchronization signal received at the second node;
during a second time period:
at the second node:
transmitting a second synchronization signal; and
accessing a second reference phase of a second local reference copy of the second synchronization signal; and
at the first node, accessing a second phase of the second synchronization signal received at the first node;
calculating a propagation delay between the first node and the second node based on:
the first reference phase of the first local reference copy;
the first phase of the first synchronization signal at the second node;
the second reference phase of the second local reference copy; and
the second phase of the second synchronization signal at the first node; and
calculating a time bias between a first internal clock of the first node and a second internal clock of the second node based on:
the first reference phase of the first local reference copy;
the first phase of the first synchronization signal at the second node;
the second reference phase of the second local reference copy; and
the second phase of the second synchronization signal at the first node.

2. The method of claim 1:
wherein accessing the first reference phase of the first local reference copy comprises, at the first node, detecting the first reference phase of a first self-receive signal associated with the first synchronization signal; and
wherein accessing the second reference phase of the second local reference copy comprises, at the second node, detecting the second reference phase of a second self-receive signal associated with the second synchronization signal.

3. The method of claim 1:
wherein transmitting the first synchronization signal comprises transmitting a first set of synchronization signals characterized by a first set of carrier frequencies;
wherein transmitting the second synchronization signal comprises transmitting a second set of synchronization signals characterized by a second set of carrier frequencies;
wherein accessing the first reference phase of the first local reference copy comprises, at the first node, accessing a first set of reference phases of a first set of local reference copies of the first set of synchronization signals;
wherein accessing the first phase of the first synchronization signal at the second node comprises, at the second node, accessing a first set of phases of the first set of synchronization signals;
wherein accessing the second reference phase of the second local reference copy comprises, at the second node, accessing a second set of reference phases of a second set of local reference copies of the second set of synchronization signals;
wherein accessing the second phase of the second synchronization signal at the first node comprises, at the first node, accessing a second set of phases of the second set of synchronization signals; and
wherein calculating the propagation delay between the first node and the second node comprises:
based on the first set of reference phases and the first set of phases, and the first set of carrier frequencies of the first synchronization signal, generating a first set of phase-frequency points;
based on the second set of reference phases and the second set of phases, and the second set of carrier frequencies of the second synchronization signal, generating a second set of phase-frequency points; and based on the first set of phase-frequency points, and the second set of phase-frequency points, calculating the propagation delay between the first node and the second node.

4. A method comprising:
during a first time period:
at a first node:
transmitting a first synchronization signal comprising a first modulated maximum length sequence; and
accessing a first phase reference associated with the first synchronization signal; and
at a second node:
receiving the first synchronization signal;
based on the first modulated maximum length sequence, calculating a first cross-correlation of the first synchronization signal; and
based on the first cross-correlation, extracting the first phase-of-arrival;
during a second time period:
at the second node:
transmitting a second synchronization signal comprising a second modulated maximum length sequence; and
accessing a second phase reference associated with the second synchronization signal; and
at the first node:
receiving the second synchronization signal;
based on the second modulated maximum length sequence, calculating a second cross-correlation of the second synchronization signal; and
based on the second cross-correlation, extracting the second phase-of-arrival; and
calculating a propagation delay between the first node and the second node based on:
the first phase reference;
the second phase reference;
the first phase-of-arrival; and
the second phase-of-arrival.

5. The method of claim 4:
wherein transmitting the first synchronization signal comprises, at the first node, transmitting a first set of synchronization signals characterized by a first set of carrier frequencies;
wherein transmitting the second synchronization signal comprises transmitting a second set of synchronization signals characterized by a second set of carrier frequencies;
wherein accessing the first phase reference comprises, at the first node, accessing a first set of phase references associated with the first set of synchronization signals;
wherein accessing the second phase reference comprises, at the second node, accessing a second set of phase references associated with the second set of synchronization signals;
wherein accessing the first phase-of-arrival comprises, at the second node, accessing a first set of phases-of-arrival of the first set of synchronization signals;
wherein accessing the second phase-of-arrival comprises, at the first node, accessing a second set of phases-of-arrival of the second set of synchronization signals; and
wherein calculating the propagation delay between the first node and the second node comprises calculating the propagation delay between the first node and the second node based on the first set of phase references, the second set of phase references, the first set of phases-of-arrival; and the second set of phases-of-arrival.

6. The method of claim 5, wherein calculating the propagation delay between the first node and the second node comprises:
for each synchronization signal, in the first set of synchronization signals, calculating a first phase-versus-frequency point in a first set of phase-versus-frequency points based on:
a phase reference, in the first set of phase references, associated with the synchronization signal;
a phase-of-arrival, in the first set of phases-of-arrival, of the synchronization signal; and
a carrier frequency, in the first set of carrier frequencies, of the synchronization signal;
based on a first regression of the first set of phase-versus-frequency points, calculating a first phase delay of the first set of synchronization signals;
for each synchronization signal, in the second set of synchronization signals, calculating a second phase-versus-frequency point in a second set of phase-versus-frequency points based on:
a phase reference, in the second set of phase references, associated with the synchronization signal;
a phase-of-arrival, in the second set of phases-of-arrival, of the synchronization signal; and
a carrier frequency, in the second set of carrier frequencies, of the synchronization signal;
based on a second regression of the second set of phase-versus-frequency points, calculating a second phase delay of the second set of synchronization signals; and
based on the first phase delay and the second phase delay, calculating the propagation delay between the first node and the second node.

7. The method of claim 4:
wherein transmitting the first synchronization signal comprises, at the first node, transmitting the first synchronization signal comprising a first frequency-shift-key-modulated code sequence;
wherein transmitting the second synchronization signal comprises, at the second node, transmitting the second synchronization signal comprising a second frequency-shift-key-modulated code sequence;
wherein accessing the first phase-of-arrival of the first synchronization signal comprises, at the second node:
based on the first frequency-shift-key-modulated code sequence, calculating a first cross-correlation of the first synchronization signal; and
based on the first cross-correlation, extracting the first phase-of-arrival; and
wherein accessing the second phase-of-arrival of the second synchronization signal comprises, at the first node:
based on the second frequency-shift-key-modulated code sequence, calculating a second cross-correlation of the second synchronization signal; and
based on the second cross-correlation, extracting the second phase-of-arrival.

8. The method of claim 4:
wherein transmitting the first synchronization signal comprises, at the first node, transmitting the first synchronization signal comprising a first Zadoff-Chu sequence;
wherein transmitting the second synchronization signal comprises, at the second node, transmitting the second synchronization signal comprising a second Zadoff-Chu sequence;

wherein accessing the first phase-of-arrival of the first synchronization signal comprises, at the second node:
based on the first Zadoff-Chu sequence, calculating a first cross-correlation of the first synchronization signal; and
based on the first cross-correlation, extracting the first phase-of-arrival; and
wherein accessing the second phase-of-arrival of the second synchronization signal comprises, at the first node:
based on the second Zadoff-Chu sequence, calculating a second cross-correlation of the second synchronization signal; and
based on the second cross-correlation, extracting the second phase-of-arrival.

9. The method of claim 4:
wherein transmitting the first synchronization signal comprises, at the first node, transmitting the first synchronization signal comprising a first frequency-hopping spread spectrum signal;
wherein transmitting the second synchronization signal comprises, at the second node, transmitting the second synchronization signal comprising a second frequency-hopping spread spectrum signal;
wherein accessing the first phase-of-arrival of the first synchronization signal comprises, at the second node:
based on the first frequency-hopping spread spectrum signal, calculating a first cross-correlation of the first synchronization signal; and
based on the first cross-correlation, extracting the first phase-of-arrival; and
wherein accessing the second phase-of-arrival of the second synchronization signal comprises, at the first node:
based on the second frequency-hopping spread spectrum signal, calculating a second cross-correlation of the second synchronization signal; and
based on the second cross-correlation, extracting the second phase-of-arrival.

10. The method of claim 4:
wherein transmitting the first synchronization signal comprises, at the first node, transmitting the first synchronization signal comprising:
comprising a first fixed preamble sequence;
comprising a first variable sync word sequence; and
wherein transmitting the second synchronization signal comprises, at the second node, transmitting the second synchronization signal comprising:
a second fixed preamble sequence; and
a second variable sync word sequence;
wherein accessing the first phase-of-arrival of the first synchronization signal comprises, at the second node:
based on the first fixed preamble sequence and the first variable sync word sequence, calculating a first cross-correlation of the first synchronization signal; and
based on the first cross-correlation, extracting the first phase-of-arrival; and
wherein accessing the second phase-of-arrival of the second synchronization signal comprises, at the first node:
based on the second fixed preamble sequence and the second variable sync word sequence, calculating a second cross-correlation of the second synchronization signal; and
based on the second cross-correlation, extracting the second phase-of-arrival.

11. A method comprising:
during a first time period:
at a first node:
transmitting a first synchronization signal; and
accessing a first phase reference for each carrier frequency in a first set of carrier frequencies, the first set of carrier frequencies characterizing the first synchronization signal; and
at a second node, accessing a first phase-of-arrival for each carrier frequency in the first set of carrier frequencies;
during a second time period:
at the second node:
transmitting a second synchronization signal; and
accessing a second phase reference for each carrier frequency in a second set of carrier frequencies, the second set of carrier frequencies characterizing the second synchronization signal; and
at the first node, accessing a second phase-of-arrival for each carrier frequency in the second set of carrier frequencies; and
calculating a time bias between the first node and the second node based on:
the first phase reference for each carrier frequency in the first set of carrier frequencies;
the first phase-of-arrival for each carrier frequency in the first set of carrier frequencies;
the second phase reference for each carrier frequency in the second set of carrier frequencies; and
the second phase-of-arrival for each carrier frequency in the second set of carrier frequencies.

12. The method of claim 11, wherein calculating the propagation delay between the first node and the second node comprises:
based on the first phase reference for each carrier frequency in the first set of carrier frequencies and the first phase-of-arrival for each carrier frequency in the first set of carrier frequencies, generating a first set of phase-frequency points;
based on the second phase reference for each carrier frequency in the second set of carrier frequencies and the second phase-of-arrival for each carrier frequency in the second set of carrier frequencies, generating a second set of phase-frequency points; and
based on the first set of phase-frequency points and the second set of phase-frequency points, calculating the propagation delay between the first node and the second node.

13. The method of claim 12, wherein calculating the propagation delay between the first node and the second node comprises:
summing the first set of phase-frequency points and the second set of phase-frequency points to generate a set of summed phase-frequency points;
calculating a linear regression of the set of summed phase-frequency points;
extracting a slope of the linear regression; and
calculating the propagation delay between the first node and the second node based on the slope of the linear regression.

14. The method of claim 11, further comprising calculating a propagation delay between the first node and the second node based on the phase reference for each carrier frequency in the first set of carrier frequencies, the phase-of-arrival for each carrier frequency in the first set of carrier frequencies, the second phase reference for each carrier frequency in the second set of carrier frequencies, and second the phase-of-arrival for each carrier frequency in the second set of carrier frequencies.

15. The method of claim 11, wherein calculating the time bias between the first node and the second node comprises:
based on the first phase reference for each carrier frequency in the first set of carrier frequencies and the first phase-of-arrival for each carrier frequency in the first set of carrier frequencies, generating a first set of phase-frequency points;
based on the second phase reference for each carrier frequency in the second set of carrier frequencies and the second phase-of-arrival for each carrier frequency in the second set of carrier frequencies, generating a second set of phase-frequency points; and
based on the first set of phase-frequency points and the second set of phase-frequency points, calculating the time bias between the first node and the second node.

16. The method of claim 15, wherein calculating the time bias between the first node and the second node comprises:
subtracting the first set of phase-frequency points from the second set of phase-frequency points to generate a set of subtracted phase-frequency points;
calculating a linear regression of the set of subtracted phase-frequency points;
extracting a slope of the linear regression; and
based on the slope of the linear regression, calculating the time bias between the first node and the second node.

17. The method of claim 11:
wherein transmitting the first synchronization signal comprises, at the first node, transmitting the first synchronization signal based on a first frequency-hopping spread spectrum scheme across the first set of carrier frequencies; and
wherein transmitting the second synchronization signal comprises, at the second node, transmitting the second synchronization signal based on a second frequency-hopping spread spectrum scheme across the second set of carrier frequencies.

18. A method comprising:
during a first time period:
at a first node:
transmitting a first synchronization signal; and
accessing a first reference phase of a first local reference copy of the first synchronization signal; and
at a second node, accessing a first phase of the first synchronization signal received at the second node;
during a second time period:
at the second node:
transmitting a second synchronization signal; and
accessing a second reference phase of a second local reference copy of the second synchronization signal; and
at the first node, accessing a second phase of the second synchronization signal received at the first node; and
calculating a time bias between a first internal clock of the first node and a second internal clock of the second node based on:
the first reference phase of the first local reference copy;
the first phase of the first synchronization signal at the second node;
the second reference phase of the second local reference copy; and
the second phase of the second synchronization signal at the first node.

\* \* \* \* \*